US012675061B2

(12) United States Patent
Shuhama

(10) Patent No.: US 12,675,061 B2
(45) Date of Patent: Jul. 7, 2026

(54) IMAGE FORMING APPARATUS UTILIZING ATTACHABLE FIRST AND SECOND TONER CONTAINER

(71) Applicant: CANON KABUSHIKI KAISHA, Tokyo (JP)

(72) Inventor: Yu Shuhama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/943,424

(22) Filed: Nov. 11, 2024

(65) Prior Publication Data

US 2025/0068118 A1 Feb. 27, 2025

Related U.S. Application Data

(63) Continuation of application No. 18/497,831, filed on Oct. 30, 2023, now Pat. No. 12,169,382, which is a (Continued)

(30) Foreign Application Priority Data

Sep. 14, 2020 (JP) ................................ 2020-154167

(51) Int. Cl.
*G03G 15/08* (2006.01)
*G03G 15/01* (2006.01)
*G03G 21/16* (2006.01)

(52) U.S. Cl.
CPC ..... *G03G 15/0865* (2013.01); *G03G 15/0121* (2013.01); *G03G 15/0874* (2013.01); *G03G 21/1633* (2013.01); *G03G 2215/0682* (2013.01)

(58) Field of Classification Search
CPC ........... G03G 15/0121; G03G 15/0126; G03G 15/0184; G03G 15/0867; G03G 15/0874; (Continued)

(56) References Cited

U.S. PATENT DOCUMENTS 5,325,162 A * 6/1994 Kroll .................. G03G 15/0126 222/DIG. 1
7,502,577 B2 * 3/2009 Kitozaki ............ G03G 15/0879 399/258

(Continued)

FOREIGN PATENT DOCUMENTS

CN 102109795 A 6/2011
CN 102385285 A 3/2012

(Continued)

*Primary Examiner* — Robert B Beatty
(74) *Attorney, Agent, or Firm* — Canon U.S.A., Inc., IP Division

(57) ABSTRACT

An image forming apparatus, a first and second toner container storing a first and second toner are attachable, a first and second photosensitive drum, a first and second toner accommodation portion, a first and second toner supply port, and a cover portion. A first and second toner supply operation where first and second toner is supplied from the first and second toner container to the first and second toner accommodating portion through the first and second toner supply port when the cover portion is in the open position. The first and second toner supply operation are performed by user operations including directly manipulating the first and second toner container to discharge the first and second toner through the first and second toner supply port while the first toner container is attached to the first toner supply port and the second toner container is attached to the second toner supply port.

10 Claims, 32 Drawing Sheets

Related U.S. Application Data continuation of application No. 18/057,029, filed on Nov. 18, 2022, now Pat. No. 11,829,095, which is a continuation of application No. 17/470,910, filed on Sep. 9, 2021, now Pat. No. 11,526,118.

(58) Field of Classification Search

CPC ........... G03G 15/0865; G03G 15/0879; G03G 15/0896; G03G 15/0875; G03G 21/1609; G03G 21/1633; G03G 21/1676; G03G 2215/0106; G03G 2215/068; G03G 2215/0682; G03G 2221/1603; G03G 2221/163

USPC ................................. 399/223, 224, 258, 262

See application file for complete search history.

(56) References Cited

U.S. PATENT DOCUMENTS

| | | | | |
|---|---|---|---|---|
| 9,389,539 | B1 * | 7/2016 | Somemiya | G03G 21/1604 |
| 2009/0035015 | A1 * | 2/2009 | Ohashi | G03G 15/0126 399/120 |
| 2009/0162096 | A1 * | 6/2009 | Sakuma | G03G 15/0872 399/119 |
| 2010/0067957 | A1 * | 3/2010 | Tazawa | G03G 15/0875 399/258 |
| 2013/0243445 | A1 * | 9/2013 | Takahira | G03G 15/0886 399/13 |
| 2013/0266340 | A1 * | 10/2013 | Hashimoto | G03G 21/1647 399/119 |
| 2016/0342133 | A1 * | 11/2016 | Hiramatsu | G03G 21/1676 |
| 2020/0064773 | A1 | 2/2020 | Sato | |
| 2023/0004118 | A1 * | 1/2023 | Sato | G03G 21/1814 |

FOREIGN PATENT DOCUMENTS

| | | | |
|---|---|---|---|
| JP | H07225514 | A | 8/1995 |
| JP | 2000284581 | A | 10/2000 |
| JP | 2002221854 | A | 8/2002 |
| JP | 2004077799 | A | 3/2004 |
| JP | 2013020126 | A | 1/2013 |
| JP | 2013205713 | A | 10/2013 |
| JP | 2014160285 | A | 9/2014 |
| JP | 2014194576 | A | 10/2014 |
| JP | 2014199419 | A | 10/2014 |
| KR | 20180011005 | A | 1/2018 |

* cited by examiner

IMAGE FORMING APPARATUS UTILIZING ATTACHABLE FIRST AND SECOND TONER CONTAINER

CROSS REFERENCE TO RELATED APPLICATIONS

The present application is a continuation of U.S. patent application Ser. No. 18/497,831, filed on Oct. 30, 2023, which is a continuation of U.S. patent application Ser. No. 18/057,029, filed on Nov. 18, 2022, and issued as U.S. Pat. No. 11,829,095 on Nov. 28, 2023, which is a continuation of U.S. patent application Ser. No. 17/470,910, filed on Sep. 9, 2021 and issued as U.S. Pat. No. 11,526,118 on Dec. 13, 2022, which claims the benefit of Japanese Patent Application No. 2020-154167, filed Sep. 14, 2020, each of which is hereby incorporated by reference herein in its entirety.

BACKGROUND

Field

The present disclosure relates to an image forming apparatus that forms an image on a recording material.

Description of the Related Art

In an electrophotographic-type image forming apparatus, an optical box forms an electrostatic latent image on a surface of a photosensitive drum, and the electrostatic latent image is developed using toner serving as a developer. International Publication No. 2020/022585 discusses a configuration in which a refilling container is attachable to an image forming apparatus and a developer container can be refilled with a developer from the outside of the main body of the apparatus.

The configuration discussed in International Publication No. 2020/022585 sufficiently satisfies the desirable size of an image forming apparatus in those days; in recent years, further downsizing has been demanded.

SUMMARY

The present disclosure is directed to meeting further user needs in areas such as an image forming apparatus to which a supply container storing a developer is detachably attachable.

According to an aspect of the present disclosure, an image forming apparatus to which a supply container storing a developer is detachably attachable and configured to form an image on a recording material, includes a photosensitive member configured to rotate, an optical box configured to irradiate the photosensitive member with light and form an electrostatic latent image on the photosensitive member, a developer bearing member configured to bear the developer and develop the electrostatic latent image formed by the optical box by supplying the developer to the photosensitive member, and a developer container including a supply port for receiving the developer to be supplied from the supply container and configured to store the developer to be borne by the developer bearing member, wherein, when viewed in a rotation axial direction of the photosensitive member, a region where the optical box is located and at least a part of a region where the supply port is located overlap each other in a horizontal direction.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the drawings. The dimensions, materials, shapes, relative arrangement, and the like of components described in the exemplary embodiments can be appropriately changed depending on a configuration of an apparatus to which the disclosure is applied and various conditions. In other words, the exemplary embodiments are not intended to limit the scope of the present disclosure.

Overall Configuration of Image Forming Apparatus

An overall configuration of an image forming apparatus 1 in a first exemplary embodiment of the present disclosure will be described. The image forming apparatus 1 of the present exemplary embodiment is a monochrome laser beam printer using an electrophotographic process, and forms an image on a recording material P, using a developer (toner), based on image information transmitted from an external apparatus such as a personal computer. Examples of the recording material P include recording paper, label paper, an overhead projector (OHP) sheet, and a cloth.

In the following description, a height direction (an upward direction in a vertical direction) of the image forming apparatus 1, in a case where the image forming apparatus 1 is placed on a horizontal surface, is a Z direction. A direction intersecting the Z direction and parallel to a rotation axial direction (a main scanning direction) of a photosensitive drum 11 to be described below is an X direction. A direction intersecting the X direction and the Z direction is a Y direction. Desirably, the X direction, the Y direction, and the Z direction orthogonally cross each other. For convenience, the plus side and the minus side in the X direction will be referred as the right side and the left side, respectively. The plus side and the minus side in the Y direction will be referred as the front side or front surface side and the back side or back surface side, respectively. Furthermore, the plus side and the minus side in the Z direction will be referred as the upper side and the lower side, respectively.

Figure 1:
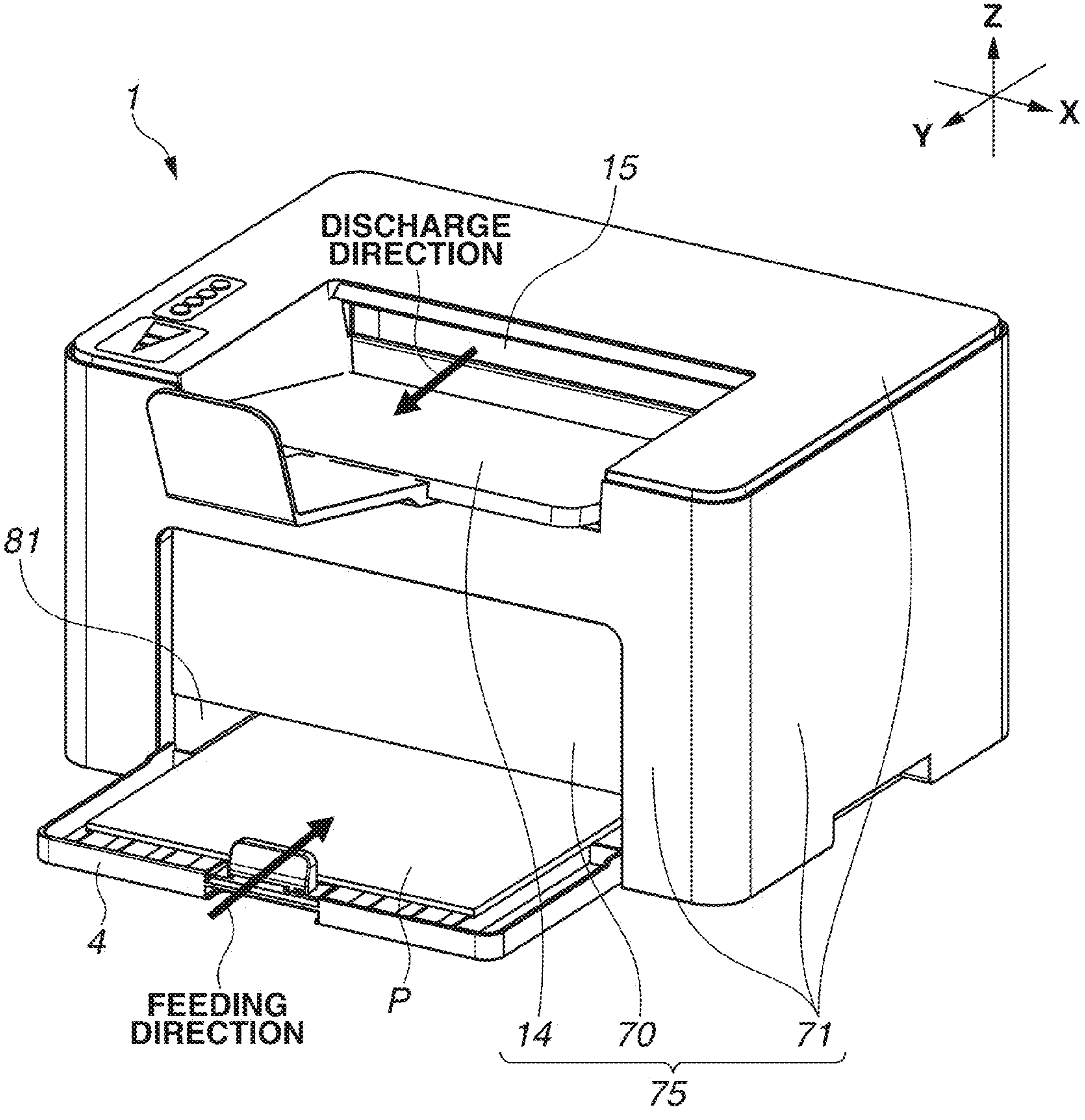
FIG. 1 is a perspective view of an image forming apparatus.
Figure 2:
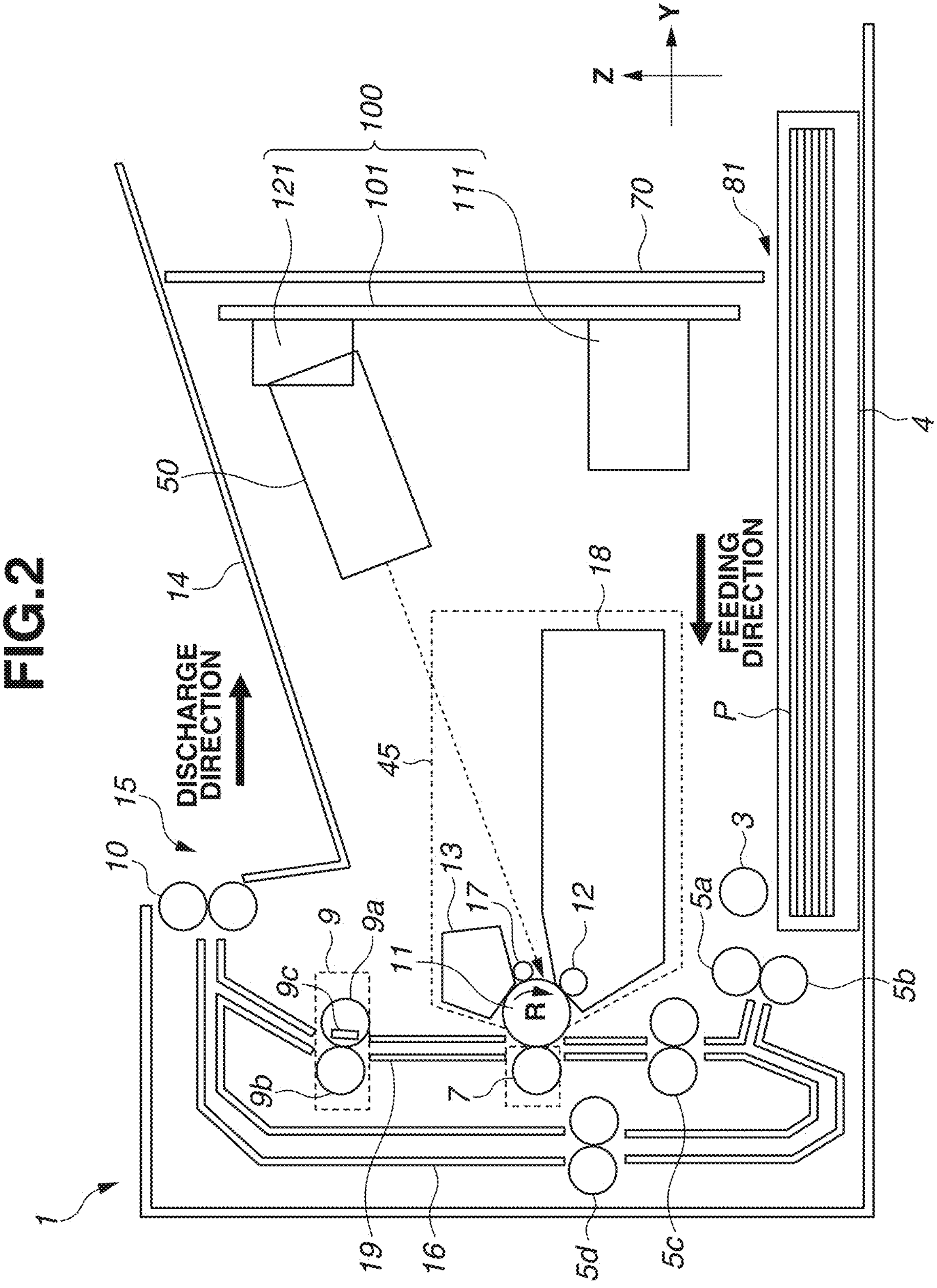
FIG. 2 is a diagram illustrating an internal configuration of the image forming apparatus.

FIG. 1 illustrates a perspective view of the image forming apparatus 1, and FIG. 2 is a diagram illustrating an internal configuration of the image forming apparatus 1 viewed from the X direction (the rotation axial direction of the photosensitive drum 11). FIG. 2 illustrates only members related to an image forming process. In FIG. 1, the image forming apparatus 1 includes a feeding cassette 4 in which recording materials P are stored, and a discharge tray 14 on which the discharged recording materials P are to be stacked. When the feeding cassette 4 is inserted into a feeding port 81, the recording materials P stored in the feeding cassette 4 can be fed into the image forming apparatus 1. The feeding cassette 4 can be drawn from the feeding port 81 in the Y direction, so that a user can add recording materials P. The recording materials P each fed from the feeding cassette 4 and having an image formed thereon are each discharged from a discharge port 15 towards a discharge direction (Y-axis plus direction) illustrated in FIG. 1, and then stacked on the discharge tray 14.

A part of an end surface (a part of the front surface) of the image forming apparatus 1 on the downstream side of the discharge direction is provided with a front cover 70 that covers a circuit board 100 to be described below. The front surface except for the part provided with the front cover 70, the side surfaces, and the top surface of the image forming apparatus 1 are provided with an exterior cover 71. The front cover 70, the exterior cover 71, and the discharge tray 14 described above form a housing 75 of the image forming apparatus 1. Further, although not illustrated in FIG. 1, the back surface side of the image forming apparatus 1 is provided with a back cover 76, and the back cover 76 also forms a part of the housing 75. Here, the housing 75 is a member that covers the entire image forming apparatus 1, and houses process members such as an optical box 50 to be described below. The feeding port 81 and the discharge port 15 described above are each an opening formed in a part of the housing 75. The recording material P is inserted into the image forming apparatus 1 through the feeding port 81, and then discharged to the outside of the image forming apparatus 1 through the discharge port 15.

A flow of an image forming operation to be performed on a recording material P will be described with reference to FIG. 2. The image forming operation is performed mainly by a process unit 45 (the photosensitive drum 11, a charging roller 17, a development roller 12, and a storage unit 18), the optical box 50, a transfer unit 7, and a fixing device 9. First, when image information is transmitted to the image forming apparatus 1, the photosensitive drum 11, which is a rotation member, is rotated in an arrow R direction at a predetermined circumferential velocity (a process speed), based on a print start signal. The optical box 50 emits a laser beam toward the photosensitive drum 11, based on the input image information. The optical box 50 is a box-shaped unit containing members such as a laser oscillator that outputs a laser beam, a polygon mirror and a lens for irradiating the photosensitive drum 11 with the laser beam, and a scanner motor for rotating the polygon mirror. The photosensitive drum 11 is charged by the charging roller 17 beforehand, and an electrostatic latent image is formed on the photosensitive drum 11 by irradiating the photosensitive drum 11 with the laser beam. Afterward, the toner stored in the storage unit 18 is carried to the photosensitive drum 11 (a photosensitive member) by the development roller 12 (a developer bearing member), so that the electrostatic latent image is developed and a toner image is formed on the photosensitive drum 11.

In parallel with the above-described image forming process, a recording material P is fed from the feeding cassette 4. On a conveyance path 19 of the image forming apparatus 1, a pickup roller 3, a feeding roller 5*a*, and a conveyance roller pair 5*c* are disposed. The pickup roller 3 (a feeding member) becomes in contact with the uppermost one of the recording materials P stored in the feeding cassette 4 and, while rotating itself, feeds the recording material P in the feeding direction (Y-axis minus direction). The feeding roller 5*a* and a separation roller 5*b* in pressure contact with the feeding roller 5*a* form a separation nip. In a case where a plurality of recording materials P is fed to the separation nip because of the influence of a frictional force between the recording materials P, the feeding roller 5*a* and the separation roller 5*b* separate the plurality of recording materials P and feed only the uppermost one to the downstream side.

The recording material P fed from the feeding cassette 4 is conveyed by the conveyance roller pair 5*c* toward the transfer unit 7 through the conveyance path 19. The transfer unit 7 includes a transfer roller 7*a*, and a transfer bias is applied to the transfer roller 7*a*, so that the toner image formed on the photosensitive drum 11 is transferred to the recording material P. The recording material P to which the toner image is transferred by the transfer roller 7*a* undergoes a heating and pressing treatment by the fixing device 9, so that the toner image is fixed to the recording material P. The fixing device 9 includes a heating roller 9*a* having a built-in fixing heater 9*c* therein, and a pressing roller 9*b* urged toward the heating roller 9*a*. The recording material P onto which the toner image is fixed is discharged to the discharge tray 14 by a discharge roller pair 10.

In a case where an image is to be formed on both surfaces of the recording material P, the discharge roller pair 10 guides the recording material P having the image formed on a first surface thereof to a duplex conveying path 16 by switching back the recording material P. The recording material P guided to the duplex conveying path 16 is conveyed again toward the transfer roller 7*a* by a duplex conveying roller pair 5*d*. After the image is formed on a second surface of the recording material P by the transfer roller 7*a*, the recording material P is discharged to the outside of the apparatus by the discharge roller pair 10. Further, the toner remaining on the photosensitive drum 11 after the toner image is transferred to the recording material P is cleaned by a cleaning unit 13.

The image forming apparatus 1 includes the circuit board 100 as illustrated in FIG. 2. The circuit board 100 includes a wiring board 101 made of an insulator, and electronic components 111 and 121 soldered to the wiring board 101. A conductor is wired on and inside the wiring board 101; the electronic components 111 and 121 are electrically connected. The circuit board 100 has a function of converting an alternating current supplied from the outside of the image forming apparatus 1 into a direct current and converting an input voltage to obtain a predetermined voltage value for the image forming process.

As illustrated in FIG. 2, the circuit board 100 is disposed such that the surface of the wiring board 101 on which the electronic components 111 and 121 are mounted extends in a direction intersecting the discharge direction. Furthermore, the wiring board 101 is provided between the front cover 70 and the optical box 50 in the discharge direction. The electronic components 111 and 121 are on the surface of the wiring board 101 facing the optical box 50.

Arrangement of Circuit Board

Figure 3:
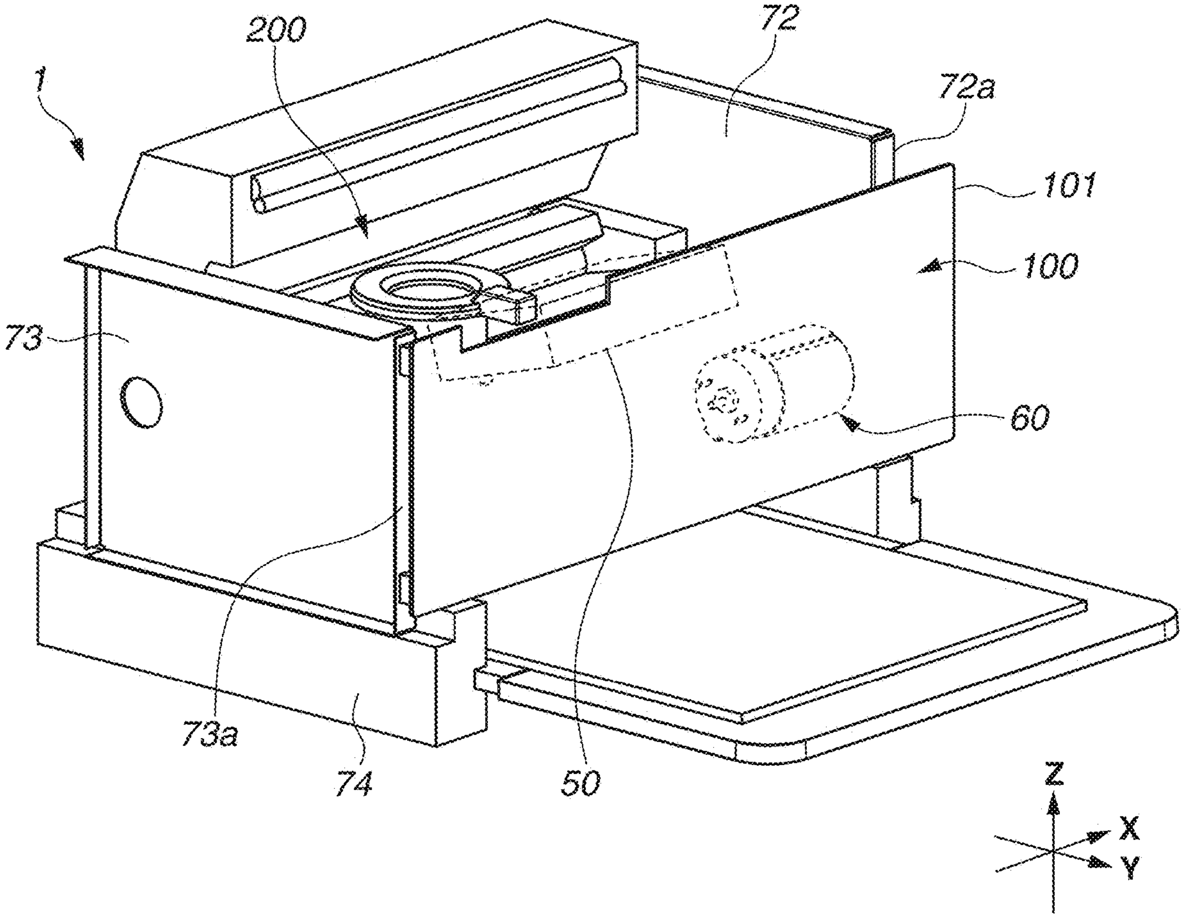
FIG. 3 is a perspective view illustrating the position of a circuit board.

The arrangement of the circuit board 100 in the present exemplary embodiment will be described in detail with reference to FIG. 3 to FIG. 8. FIG. 3 is a perspective view of the image forming apparatus 1 for describing how the circuit board 100 is arranged. Unlike FIG. 1, the front cover 70 and the exterior cover 71 are omitted in FIG. 3. A supply unit 200 for supplying the toner is additionally illustrated in FIG. 3. In the image forming apparatus 1 of the present exemplary embodiment, a user or serviceman can supply the developer from the supply unit 200, and the supply unit 200 is connected to the storage unit 18 in the inside of the apparatus. The details of the supply unit 200 will be described below.

As illustrated in FIG. 3, the circuit board 100 is installed on the front surface side, and the optical box 50 and a drive motor 60 (a drive source) are disposed in the back of the circuit board 100 (i.e., on the minus side in the Y direction). The optical box 50 and the drive motor 60 are arranged at positions where these are actually invisible and thus are each indicated by a dotted line in FIG. 3.

As illustrated in FIG. 3, the image forming apparatus 1 has a right-side plate frame 72 (a first side plate frame), a left-side plate frame 73 (a second side plate frame), and a base frame 74. The right-side plate frame 72 supports an end (a first end) on the right side of the photosensitive drum 11 in the X direction, and the left-side plate frame 73 supports an end (a second end) on the left side of the photosensitive drum 11 in the X direction. The base frame 74 is at the bottom of the image forming apparatus 1 and supports the right-side plate frame 72 and the left-side plate frame 73 from below.

The circuit board 100 is, supported by these frame members, mounted in the image forming apparatus 1 in such a manner that the board surface of the circuit board 100 is substantially parallel to an XZ plane. Bent portions 72*a* and 73*a* for reinforcement are formed at an end of the right-side plate frame 72 and an end of the left-side plate frame 73, respectively, in the Y direction. The bent portion 72*a* is bent toward the plus side in the X direction to be substantially parallel to the XZ plane, and the bent portion 73*a* is bent toward the minus side in the X direction to be substantially parallel to the XZ plane. In other words, the bent portions 72*a* and 73*a* are bent to extend along the surface of the wiring board 101. In this way, the plate frames on the both sides are each bent toward the outside of the image forming apparatus 1 (in a direction away from the photosensitive drum 11 in the X direction), so that electronic components can be mounted in a larger area of the wiring board 101.

Figure 4:
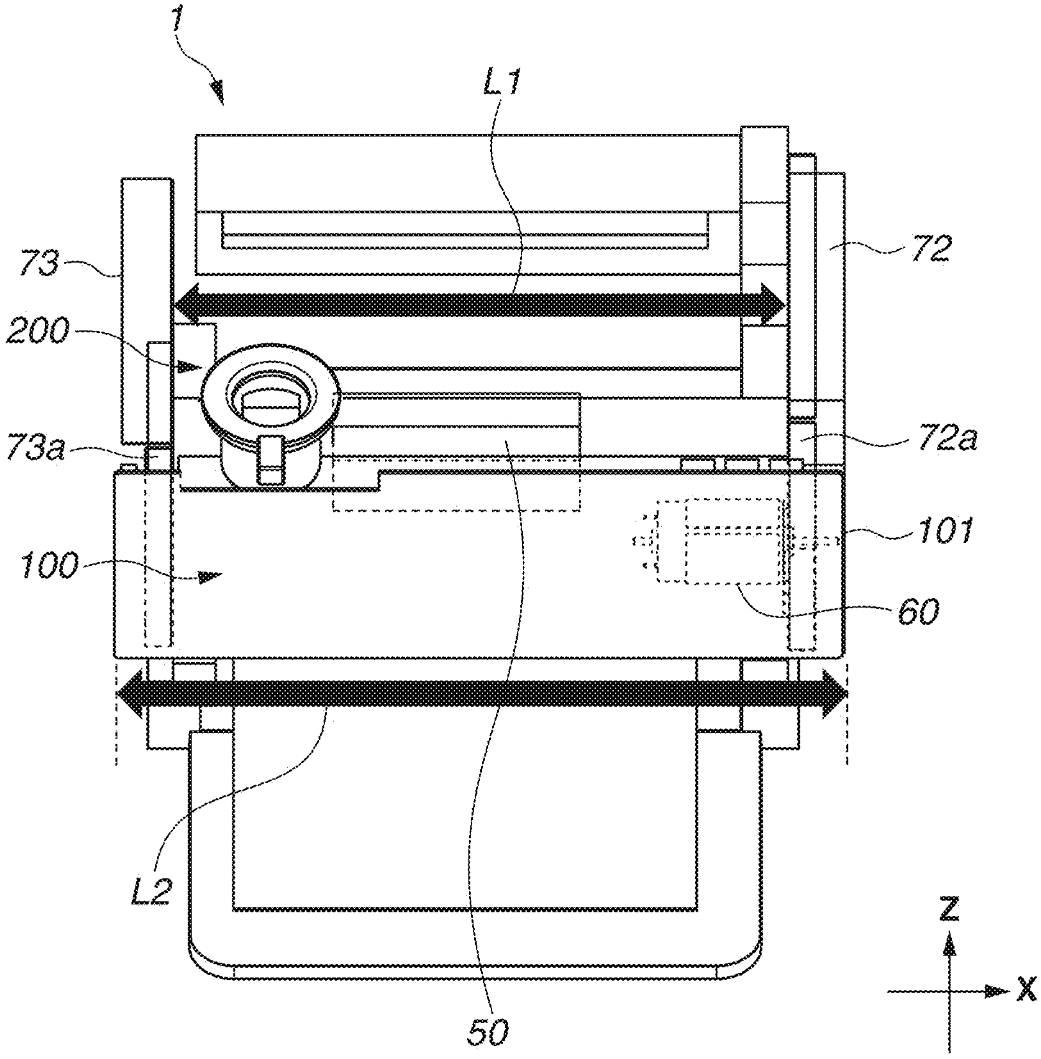
FIG. 4 is a front perspective view illustrating the position of the circuit board.

FIG. 4 is a front perspective view of the image forming apparatus 1 for describing the arrangement of the circuit board 100. As illustrated in FIG. 4, a distance L1 between the inner surface of the right-side plate frame 72 and the inner surface of the left-side plate frame 73 in the X direction is shorter than a length L2 of the circuit board 100 in the X direction. The wiring board 101 is located further on the plus side in the Y direction than the bent portions 72*a* and 73 (i.e., on the front surface side), and the wiring board 101 is in contact with each of the bent portions 72*a* and 73*a*. When viewed from the front surface side, the circuit board 100 overlaps the bent portions 72*a* and 73*a*. A part of each of the bent portions 72*a* and 73*a* and a part of each of the optical box 50 and the drive motor 60 are arranged at positions where these are actually invisible and thus are each indicated by a dotted line in FIG. 4.

In this way, the circuit board 100 is provided on the front surface side and extends between the right-side plate frame 72 and the left-side plate frame 73, so that there is no need to provide a wire bundle or the like crossing an area between the right-side plate frame 72 and the left-side plate frame 73 in the Y direction in the image forming apparatus 1. Therefore, the length of the wire bundle can be shorter than in a conventional case, and the cost can be reduced accordingly. Moreover, the area where the wire bundle runs can be smaller than in the conventional case, so that electric noise can also be reduced.

Configuration of Back Cover

Figure 32A:
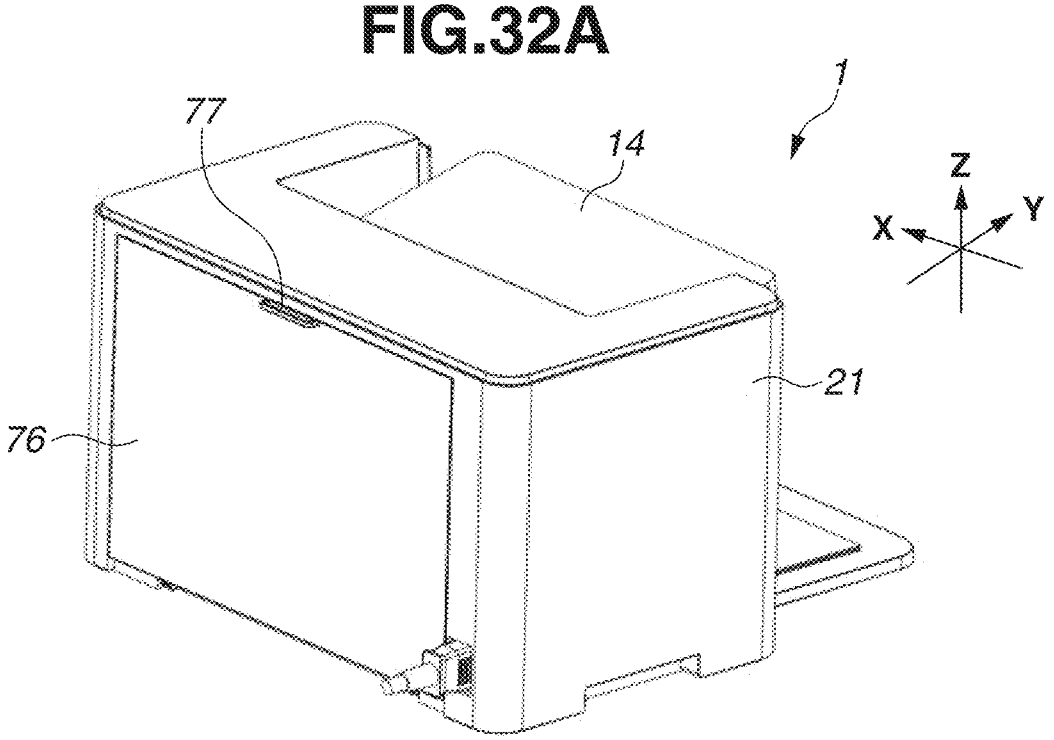
FIGS. 32A and 32B are rear perspective views of the image forming apparatus.
Figure 32B:
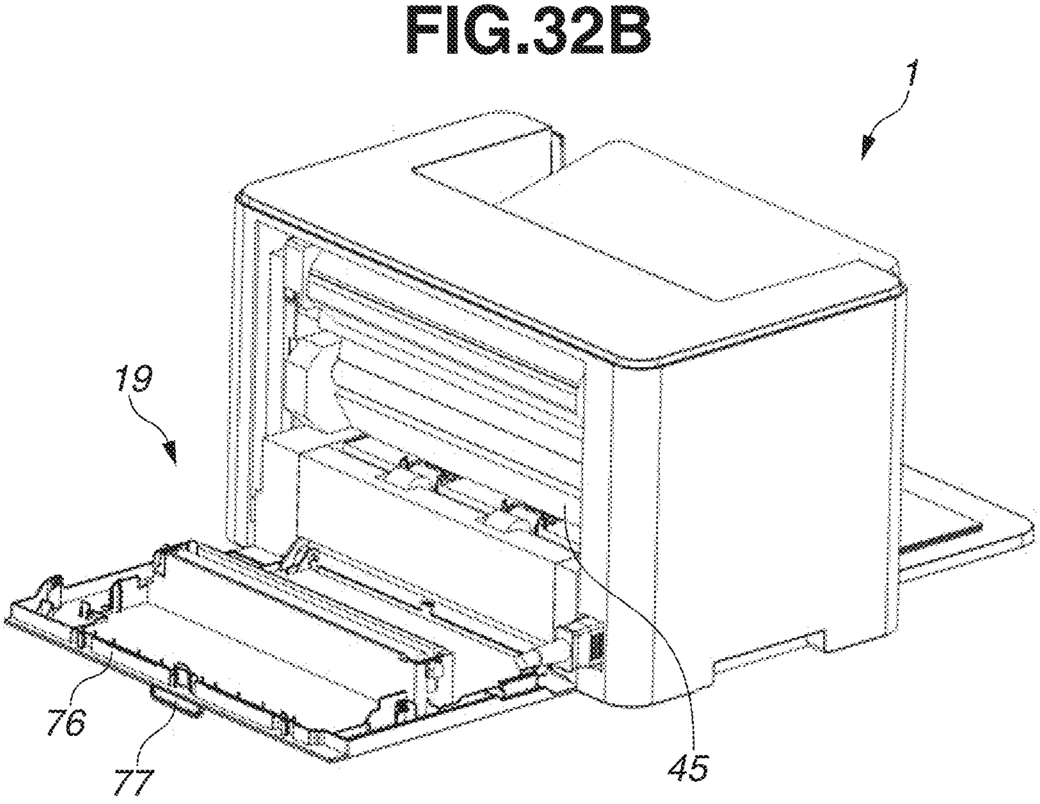

Next, a configuration of the back surface side of the image forming apparatus 1 will be described with reference to FIGS. 32A and 32B. FIG. 32A illustrates a state where the back cover 76 is closed, and FIG. 32B illustrates a state where the back cover 76 is open.

As illustrated in FIG. 32A, the back cover 76 is provided with a handle 77, and the user or serviceman can open the back cover 76 by pinching the handle 77. As illustrated in FIG. 32B, when the back cover 76 is open, the conveyance path 19 for conveying a recording material P and the process unit 45 are exposed. The user or serviceman can thus perform maintenance work such as clearing a paper jam or replacing the process unit 45.

By opening the back cover 76, the user or serviceman can access not only the conveyance path 19 but also the duplex conveying path 16, and also can access not only the process unit 45 but also the transfer unit 7 and the fixing device 9.

In this way, in the configuration of the present exemplary embodiment, the user or serviceman can perform the maintenance work for components at a time from the back surface side of the image forming apparatus 1, and therefore, the circuit board 100 can be disposed in a space on the front surface side of the image forming apparatus 1.

Positional Relationship Between Electronic Component and Optical Box

Next, the positional relationship between the electronic components 111 and the optical box 50 will be described in detail with reference to FIG. 5 to FIG. 7.

Figure 5:
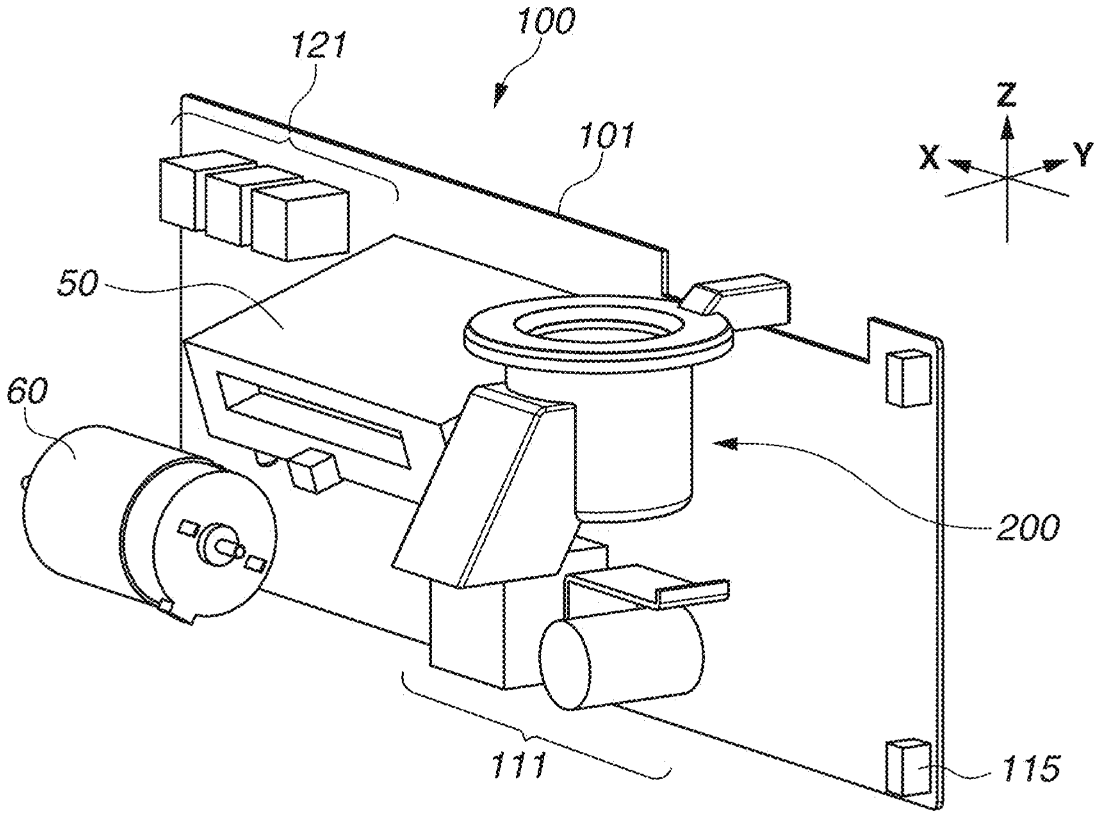
FIG. 5 is a perspective view of the circuit board and peripheral members thereof.

FIG. 5 is a perspective view illustrating the circuit board 100 when viewed from the back side of the main body. The electronic components 111 are larger in size in the Y direction than other members, and thus are disposed close together at a lower part of the wiring board 101 to fit in an area below the optical box 50, in order to use the space effectively. To be more specific, the electronic components 111 are arranged in the area lower than the center of the wiring board 101 in the vertical direction. An end of the wiring board 101 is provided with a power supply input unit 115. The power supply input unit 115 is connected to an inlet 116 to be described below and receives power from a commercial power supply.

Figure 6:
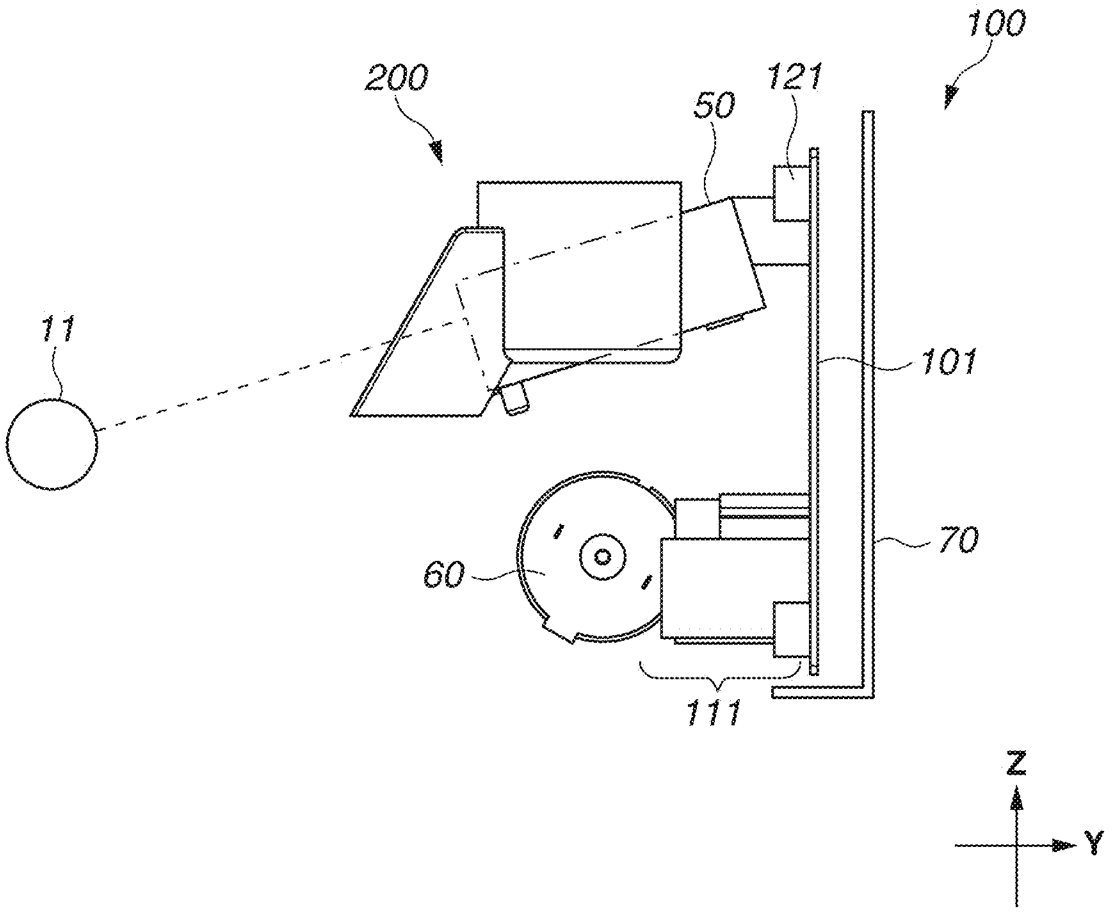
FIG. 6 is a side view of the circuit board and peripheral members thereof.

FIG. 6 is a view illustrating the circuit board 100 when viewed from the left side surface of the main body. A part of the optical box 50 is disposed at a position overlapping the supply unit 200 and thus is actually invisible, and therefore, this region is indicated by a dashed-dotted line. The optical box 50 is disposed at the position most suitable for irradiating the photosensitive drum 11 with a laser beam indicated by a dotted line. Further, none of members that greatly protrude from the board surface, such as the electronic components 111, is disposed in the region where the optical box 50 and the wiring board 101 are closest to each other in the Y direction. In other words, the optical box 50 and the electronic components 111 are arranged such that they are not aligned in the Z direction to avoid interfering with each other.

Figure 7:
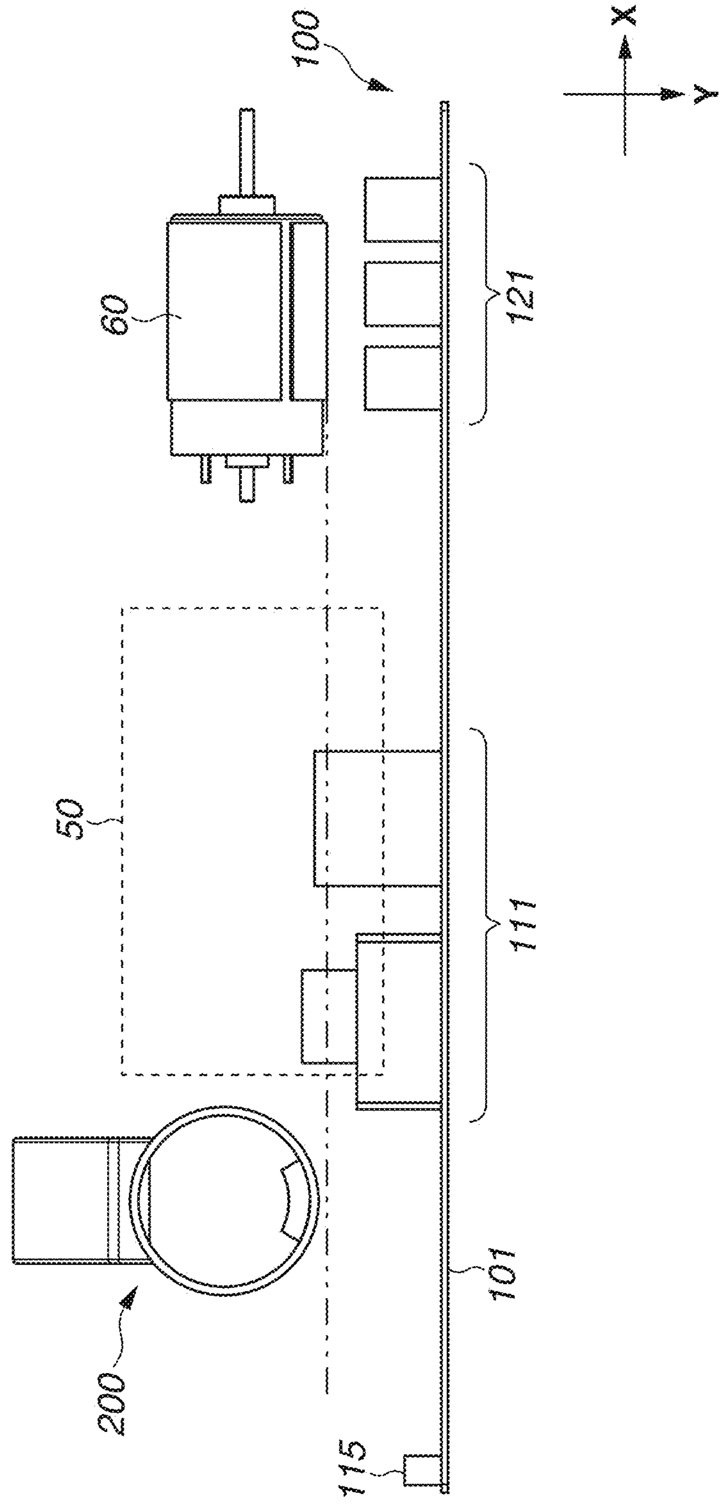
FIG. 7 is a top view of the circuit board and peripheral members thereof.

FIG. 7 is an enlarged top view illustrating the circuit board 100 when viewed from the top surface of the main body. As illustrated in FIG. 7, the optical box 50 and the electronic components 111 are arranged at positions partially overlapping each other. As described above, the optical box 50 is disposed above the electronic components 111, and thus the electronic components 111 are supposed to be invisible from this direction. In FIG. 7, the optical box 50 is indicated by a dotted line and the electronic components 111 are seen through the optical box 50, in order to clearly illustrate the positional relationship between these members.

Because the electronic components 111 are at the above-described positions, the distance between the circuit board 100 and the optical box 50 in the Y direction (a front-back direction) can be reduced and the image forming apparatus 1 can be thus downsized.

Positional Relationship Between Electronic Components and Drive Motor

Next, the positional relationship between the electronic components 111 and the drive motor 60 will be described in detail with reference to FIG. 5 to FIG. 7. The drive motor 60 has a role of rotating conveyance members (e.g., the pickup roller 3, the feeding roller 5*a*, and the conveyance roller pair 5*c*) for conveying/feeding the recording material P, and the photosensitive drum 11.

As illustrated in FIG. 5, the drive motor 60 protrudes on the minus side in the X direction, and the wiring board 101 is disposed on the front surface side of the main body relative to the drive motor 60. The electronic components 111 are mounted to avoid the drive motor 60 not to interfere with the drive motor 60. As illustrated in FIG. 6, when viewed from the left side surface of the main body, the drive motor 60 and the electronic components 111 are arranged at positions partially overlapping each other. Further, as illustrated in FIG. 7, the drive motor 60 and the electronic components 111 are not aligned in the X direction to avoid interfering with each other, when viewed from the top surface of the main body.

Because the electronic components 111 are arranged at the above-described positions, the distance between the circuit board 100 and the drive motor 60 in the Y direction (the front-back direction) can be reduced and the image forming apparatus 1 can be thus downsized.

Configuration for Installation in Main Body

Figure 8:
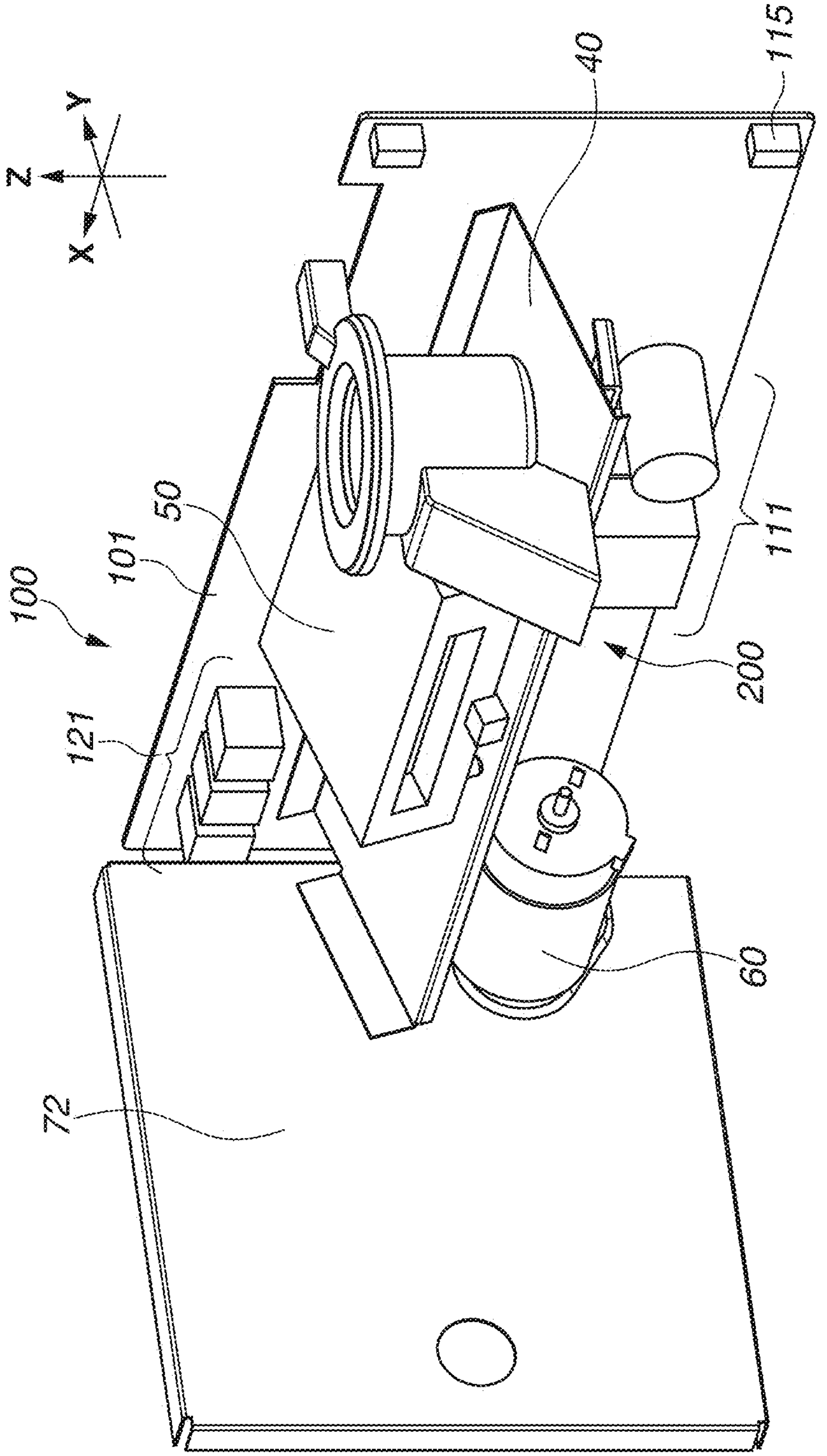
FIG. 8 is a perspective view illustrating a configuration for holding an optical box and a drive motor.

Next, a configuration for installation of the optical box 50 and the drive motor 60 in the main body will be described in detail with reference to FIG. 8. FIG. 8 is equivalent to the perspective view in FIG. 5 except that the right-side plate frame 72 and a scanner holding member 40 are added in FIG. 8. The left-side plate frame 73 and the base frame 74 are omitted in FIG. 8.

The optical box 50 is held by the scanner holding member 40. The scanner holding member 40 is fixed to each of the right-side plate frame 72 and the left-side plate frame 73 (not illustrated in FIG. 8), and configured to be a bridge between these two frames by extending below the supply unit 200. The drive motor 60 is fixed to the right-side plate frame 72, and a gear connected to the drive motor 60 is disposed on the plus side (the right side) in the X direction of the right-side plate frame 72. The driving force of the drive motor 60 is transmitted to the feeding roller 5*a* and the photosensitive drum 11 via this gear.

Configuration of Circuit Board

Figure 9:
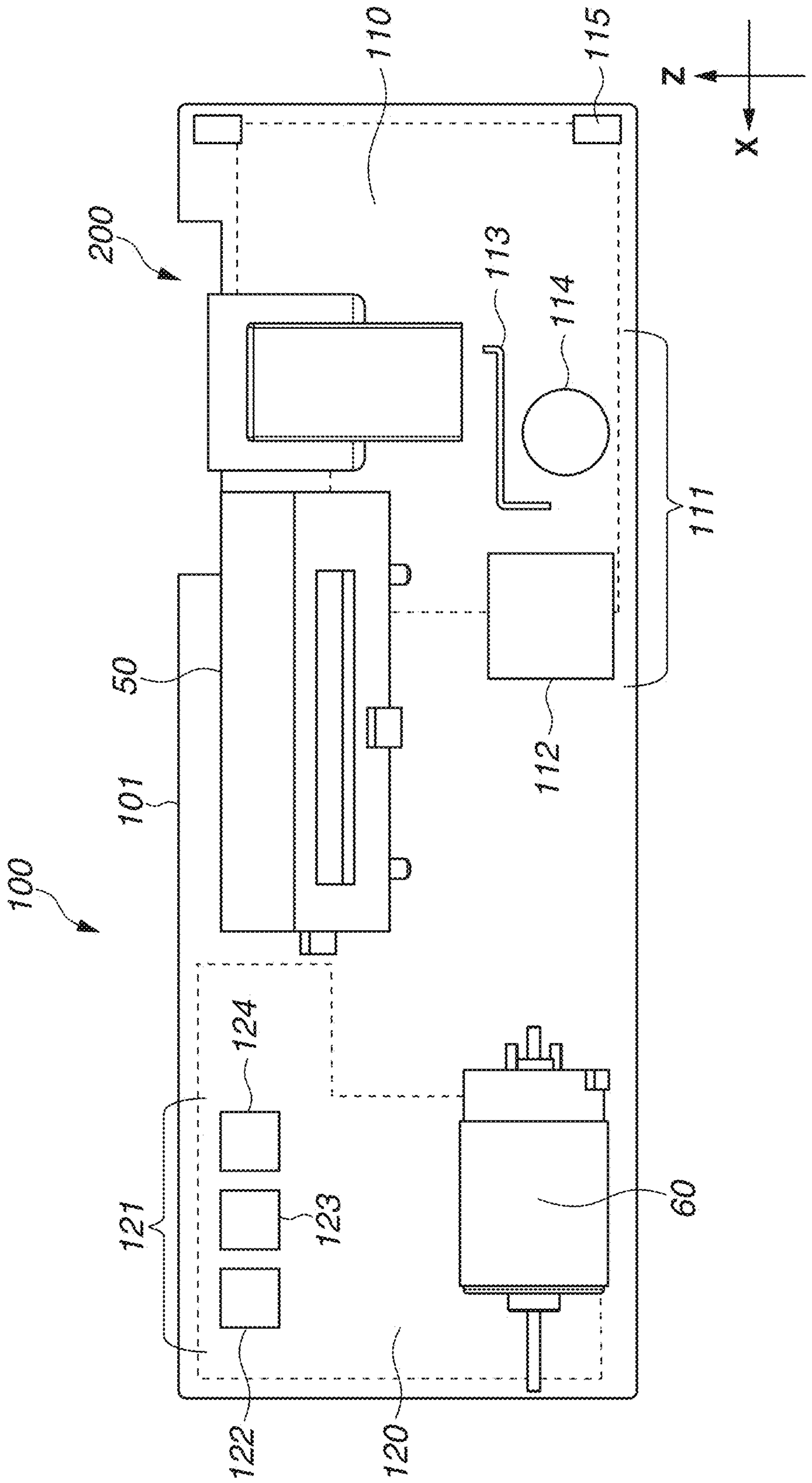
FIG. 9 is a rear view of the circuit board viewed from a direction perpendicular to a board surface.
Figure 10:
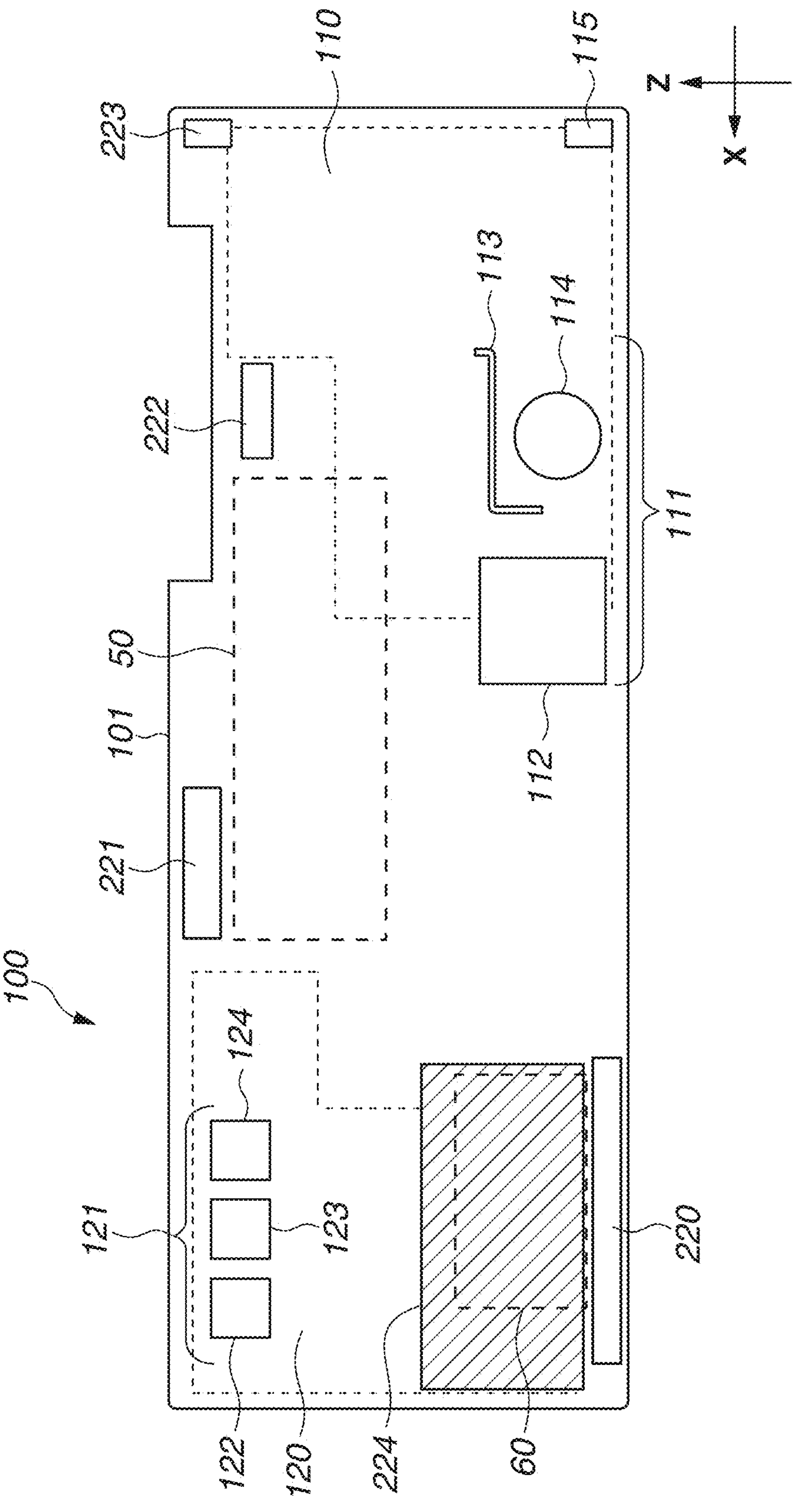
FIG. 10 is a diagram illustrating electronic components on the circuit board.

Next, a configuration of the circuit board 100 will be described with reference to FIG. 9 and FIG. 10. FIG. 9 is a rear view of the circuit board 100 when viewed from the back side of the main body. FIG. 9 illustrates the optical box 50, the drive motor 60, and the supply unit 200, as well as the circuit board 100. FIG. 10 only illustrates the circuit board 100.

The circuit board 100 includes a low-voltage power supply unit 110 that takes in alternating current power from an external commercial power supply and converts the received power into direct current power, and a high-voltage power supply unit 120 that supplies a high voltage for image forming to each processing member. In the circuit board 100 of the present exemplary embodiment, the low-voltage power supply unit 110 and the high-voltage power supply unit 120 are mounted on the same board.

The low-voltage power supply unit 110 includes a low-voltage power transformer 112, a heat sink 113, and an electrolytic capacitor 114 as the electronic components 111 large in size in the Y direction. The low-voltage power supply unit 110 further includes the power supply input unit 115. The high-voltage power supply unit 120 includes a charging transformer 122, a development transformer 123, and a transfer transformer 124 as the electronic components 121 large in size in the Y direction. As illustrated in FIG. 9, each of the electronic components 111 and 121 large in size in the Y direction is disposed to avoid the positions of the optical box 50, the drive motor 60 and the supply unit 200.

Other components on the circuit board 100 will be described with reference to FIG. 10. Upper and lower ends of the circuit board 100 are provided with a plurality of connectors 220, 221, 222, and 223, so that the circuit board 100 is connected to various members by wire bundles. The connector 220 is connected to members such as the drive motor 60 and a sensor (not illustrated) for detecting the recording material P being conveyed. The connector 221 is connected to a laser output unit (not illustrated) and the scanning motor (not illustrated) for rotating the polygon mirror of the optical box 50. The connector 222 is connected to a control panel (not illustrated) including a power switch and an execution key to be operated by the user, and a video controller 140. The connector 223 is connected to the fixing heater 9*c*. In a shaded portion 224 facing the drive motor 60, electronic components small in size in the Y direction compared to the other members included in the high-voltage power supply unit 120 are mounted. Specifically, a resistance and a jumper wire are disposed in this portion. The resistance provided at this position has a role of adjusting various biases output from the charging transformer 122, the development transformer 123, and the transfer transformer 124.

Figure 11:
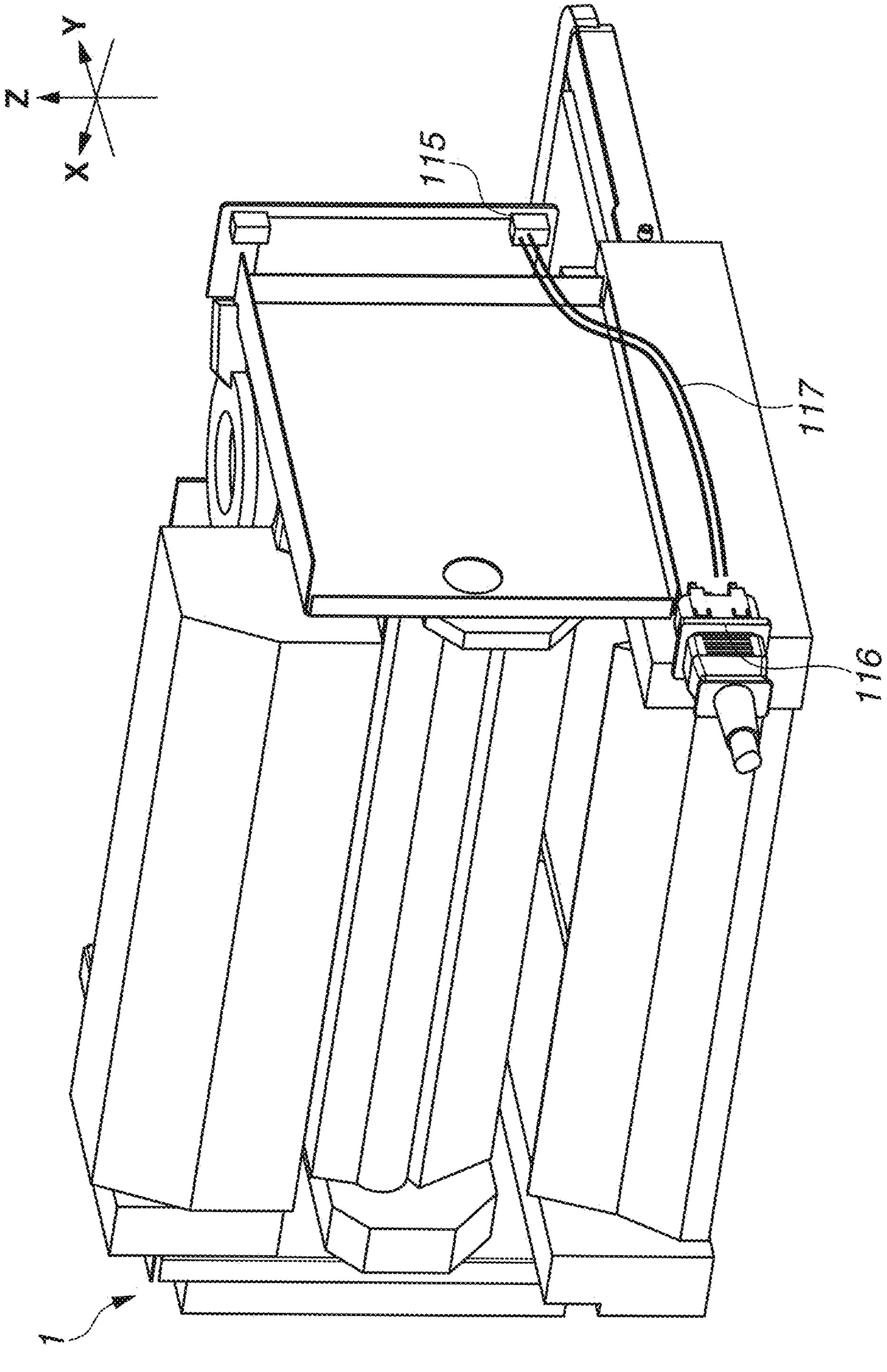
FIG. 11 is a perspective view illustrating the position of an inlet.

FIG. 11 is a perspective view of the image forming apparatus 1 when viewed from the back side of the main body, and the front cover 70 and the exterior cover 71 are omitted in FIG. 11. As described above, a power cable 117 extends from the inlet 116, and the power cable 117 is connected to the power supply input unit 115.

Figure 12:
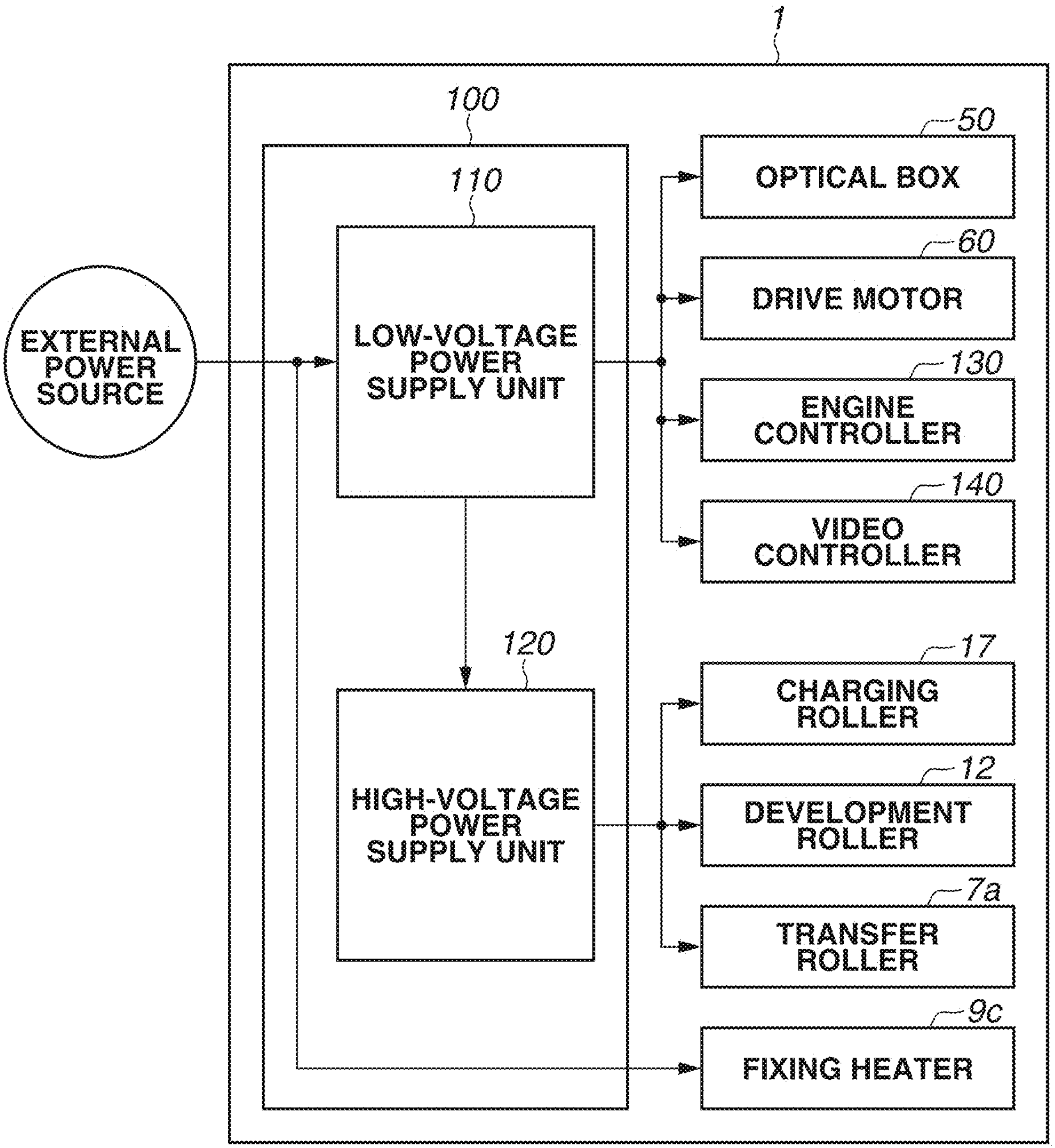
FIG. 12 is a block diagram illustrating functions of the circuit board.

Next, the functions of the low-voltage power supply unit 110 and the high-voltage power supply unit 120 will be described with reference to FIG. 9 and FIG. 12. FIG. 12 is a block diagram illustrating the functions of the circuit board 100.

First, the low-voltage power supply unit 110 takes in power from an external power source via the power supply input unit 115 mounted at the end of the circuit board 100, and converts an alternating current voltage into a stable direct current voltage, using a rectifying/smoothing circuit including the electrolytic capacitor 114. Subsequently, the low-voltage power supply unit 110 converts the direct current voltage into a high-frequency alternating current voltage using a switching element such as a transistor, and inputs the high-frequency alternating current voltage into the low-voltage power transformer 112. The low-voltage power transformer 112 converts the high-frequency alternating current voltage, which is an input voltage, into an alternating current voltage (an output voltage) having a desired voltage value. The low-voltage power supply unit 110 converts the alternating current voltage into a direct current voltage again and outputs the obtained direct current voltage to the high-voltage power supply unit 120. Further, in the low-voltage power supply unit 110, individual circuit components can get damaged due to heat, and thus the heat sink 113 made of aluminum or iron for radiating the heat is disposed.

The high-voltage power supply unit 120 converts the voltage (e.g., 24 V) supplied from the low-voltage power supply unit 110 into a high voltage desirable for the image forming process including charging, development, and transfer. The charging transformer 122 converts the voltage supplied from the low-voltage power supply unit 110 into a voltage for charging, and the voltage for charging is supplied to the charging roller 17. The development transformer 123 converts the voltage supplied from the low-voltage power supply unit 110 into a voltage for development, and the voltage for development is supplied to the development roller 12. The transfer transformer 124 converts the voltage supplied from the low-voltage power supply unit 110 into a voltage for transfer, and the voltage for transfer is supplied to the transfer roller 7*a*.

The low-voltage power supply unit 110 also supplies a voltage (e.g., 3.3 V or 5 V) to each of the optical box 50, the drive motor 60, an engine controller 130, and the video controller 140 besides the high-voltage power supply unit 120. Here, the engine controller 130 has a role of controlling various process members collectively. The engine controller 130 includes a central processing unit (CPU) (not illustrated), a random access memory (RAM) (not illustrated) used to calculate and temporarily store data for controlling the image forming apparatus 1, and a read only memory (ROM) (not illustrated) storing a program for controlling the image forming apparatus 1 and various data. The video controller 140 has a role of receiving print data from an external apparatus, such as a personal computer, through communication therewith, analyzing the received print data, and notifying the engine controller 130 of the result of analyzing the print data. The engine controller 130 and the video controller 140 may be on another board different from the circuit board 100 or may be on the same board.

Further, the alternating current power received by the power supply input unit 115 from the commercial power supply is supplied to not only the low-voltage power supply unit 110 but also the fixing heater 9*c*. In the circuit board 100 illustrated in FIG. 10, a triac (not illustrated) is disposed between the power supply input unit 115 and the connector 223, and a sinusoidal waveform is changed by turning on/off the triac, so that the temperature at the fixing heater 9*c* can be adjusted. The drive motor 60 drives members such as the rollers in the fixing device 9.

Arrangement and Configuration of Supply Unit

Next, the arrangement and configuration of the supply unit 200 will be described with reference to FIG. 13 to FIG. 18. As described above, the image forming apparatus 1 is provided with the supply unit 200 for supplying the toner from outside without removing the storage unit 18 from the housing 75 in a case where a toner remaining amount in the storage unit 18 has decreased. A supply pack 210 to be described below is detachably attachable to the supply unit 200.

Figure 13:
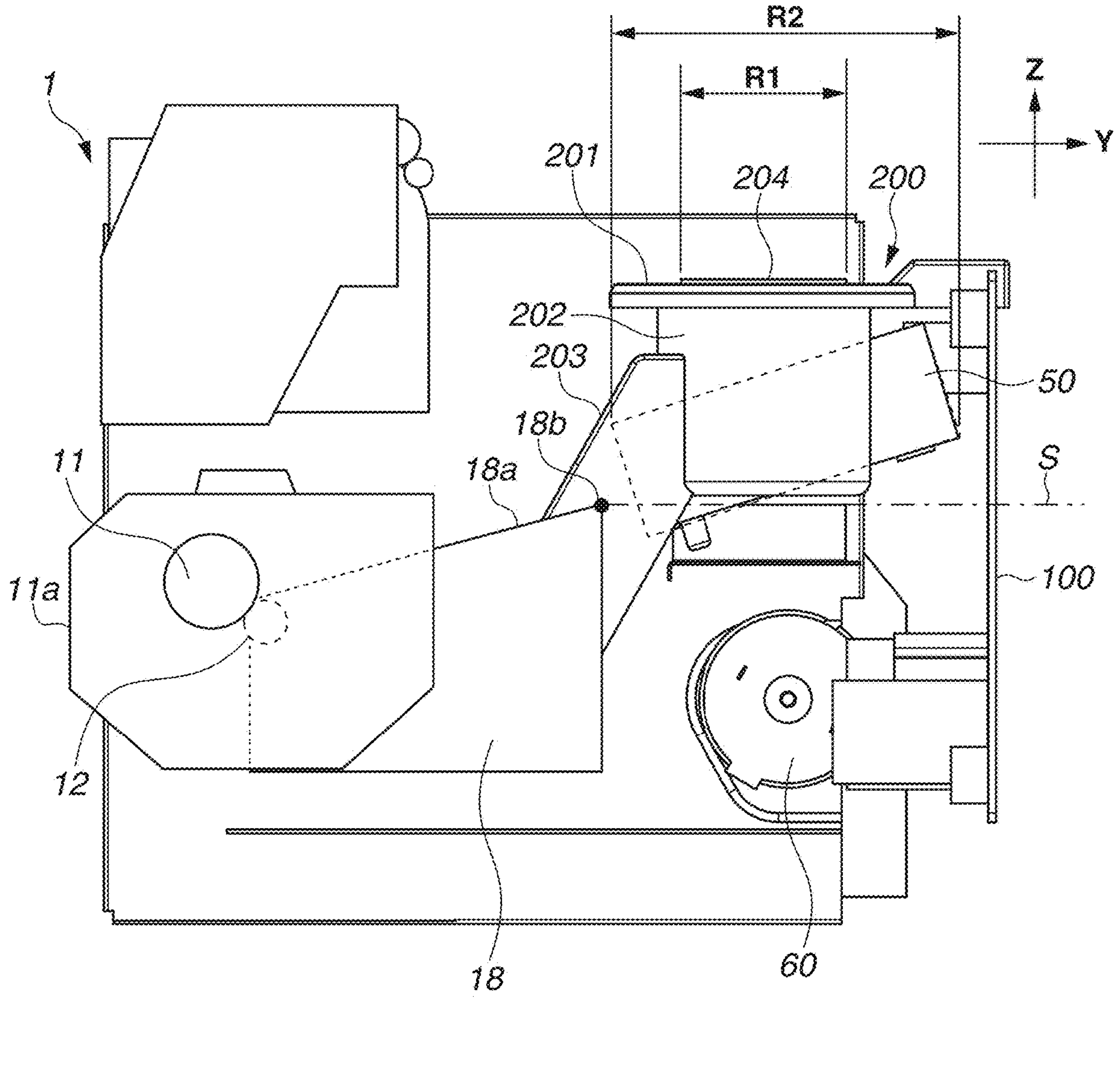
FIG. 13 is a side view illustrating the position of each of a supply unit and the optical box.

FIG. 13 is a left side view of the image forming apparatus 1 when viewed from the rotation axial direction of the photosensitive drum 11. The exterior cover 71 and the left-side plate frame 73 are removed in FIG. 13. The supply unit 200 includes an attachment portion 201 to which the supply pack 210 (not illustrated in FIG. 13) is to be attached, a toner receiving portion 202 having a cylindrical shape, and a supply path portion 203 linking the storage unit 18 and the toner receiving portion 202. The attachment portion 201 forms a supply port 204 that is an opening for supplying the toner. After passing through the supply port 204, the toner moves to the toner receiving portion 202 and then to the supply path portion 203, and is eventually supplied to the storage unit 18.

A part of the optical box 50 is disposed at a position overlapping the supply unit 200 and thus is actually invisible in FIG. 13; this region is indicated by a dotted line in FIG. 13. Specifically, the toner receiving portion 202 and the supply path portion 203 of the supply unit 200 overlap the optical box 50. In other words, the toner receiving portion 202 and the supply path portion 203 are at positions overlapping the optical box 50 in the Z direction. Here, when a region where the supply port 204 is disposed in the Y direction (horizontally) is a region R1, and a region where the optical box 50 is disposed in the Y direction is a region R2, the regions R1 and R2 overlap each other.

Further, a virtual surface that passes through an upper end 18*b* located at the uppermost position in a frame 18*a* of the storage unit 18 and is parallel to the horizontal surface is a virtual surface S. The virtual surface S is indicated by a dashed-dotted line in FIG. 13. With respect to the virtual surface S, a part of the supply unit 200 is disposed on the plus side (the upper side) in the Z direction. In other words, the part of the supply unit 200 protrudes upward relative to the upper end 18*b* of the storage unit 18. The part of the supply unit 200 specifically includes the entire attachment portion 201, a part of the toner receiving portion 202, and a part of the supply path portion 203. Further, the part of the toner receiving portion 202 and the part of the supply path portion 203 that protrude upward from the virtual surface S overlap the optical box 50.

As illustrated in FIG. 13, a part of the storage unit 18 is disposed at a position overlapping a drum frame 11*a* supporting the photosensitive drum 11 and thus is actually invisible; this region is indicated by a dotted line. The storage unit 18 supports the development roller 12 that bears the developer. The development roller 12 is also disposed at a position where the roller is actually invisible, and thus is indicated by a dotted line in FIG. 13.

Figure 14:
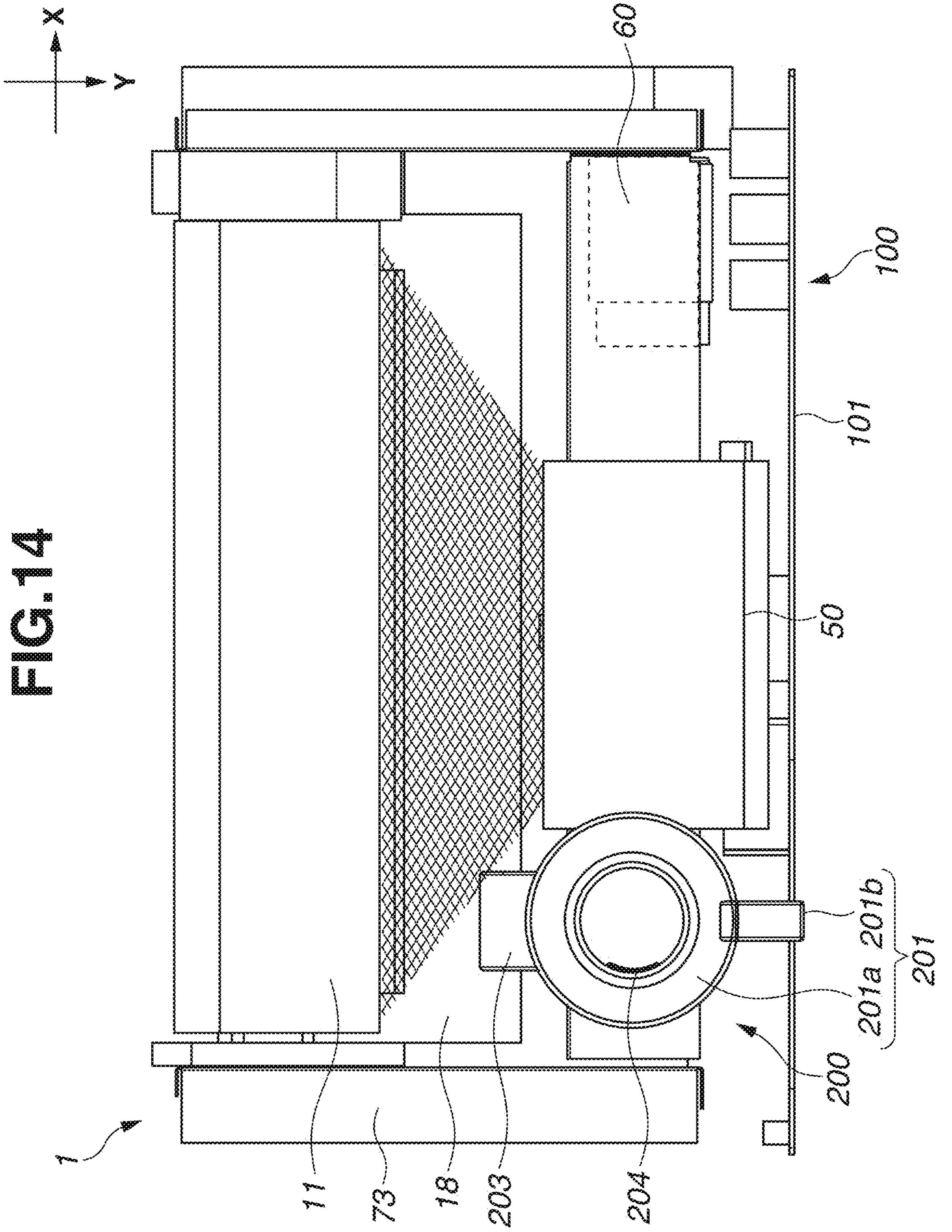
FIG. 14 is a top view illustrating the position of each of the supply unit and the optical box.

FIG. 14 is a top view of the image forming apparatus 1, from which the exterior cover 71 is removed. As described above, the attachment portion 201 forms the supply port 204. Further, the attachment portion 201 includes a ring portion 201*a* surrounding the supply port 204, and a lever portion 201*b* connected to the ring portion 201*a*. As illustrated in FIG. 14, the width of the supply unit 200 in the X direction is shorter than the width of the storage unit 18 in the X direction.

Here, the laser beam emitted from the optical box 50 to the photosensitive drum 11 spreads in the shape of a trapezoid as illustrated in FIG. 14, by the action of the polygon mirror and the lens (neither of them illustrated). The width of the optical box 50 is thus shorter than the width of the photosensitive drum 11 in the X direction. As a result, a space is formed between the left end of the optical box 50 and the left-side plate frame 73, and, in the present exemplary embodiment, the supply unit 200 is provided in this space. In other words, as illustrated in FIG. 14, the supply unit 200 is located between the optical box 50 and the left-side plate frame 73 in the X direction. Further, the supply port 204 and the optical box 50 are aligned within the region where the storage unit 18 is disposed in the X direction. Because the supply unit 200 is provided at such a position, the influence thereof on the size of the image forming apparatus 1 can be small.

Furthermore, the supply unit 200 is provided on the side opposite to the drive motor 60 with the optical box 50 therebetween. Because the drive motor 60 adopted in the present exemplary embodiment is relatively small in size, the supply unit 200 and the drive motor 60 do not overlap each other in the Z direction as illustrated in FIG. 13. Although the supply unit 200 and the drive motor 60 can be on the same side with the optical box 50 therebetween, the supply unit 200 needs to be disposed at an upper position in a case where a drive motor 60 having a larger size is adopted. This results in an increase in the size of the image forming apparatus 1. If the supply unit 200 and the drive motor 60 are disposed on the opposite sides to each other as described in the present exemplary embodiment, it is possible to adopt a drive motor 60 having a larger size without increasing the size of the image forming apparatus 1. In other words, a degree of freedom in design can be secured.

Figure 15:
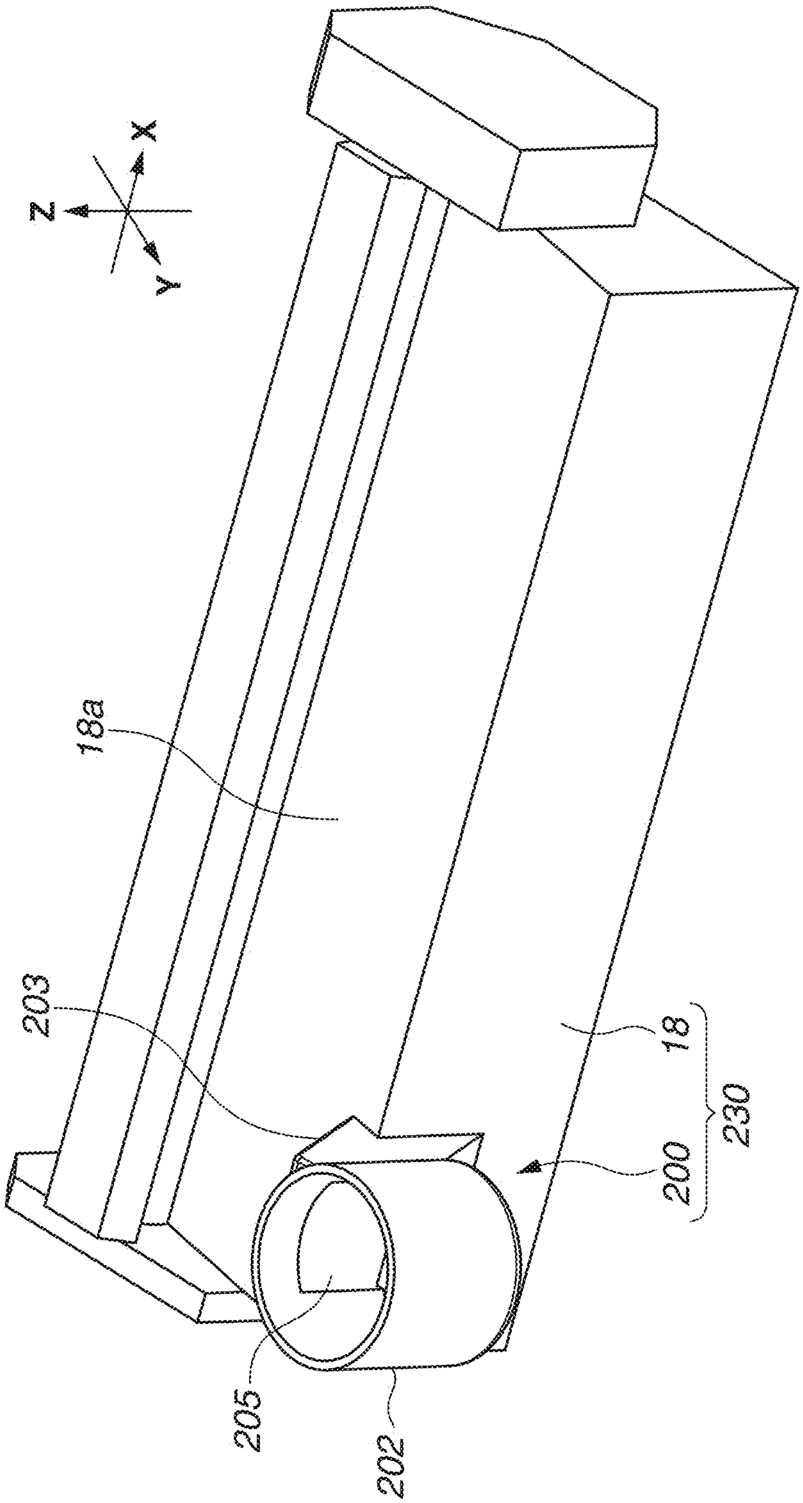
FIG. 15 is a perspective view of a developer container.

FIG. 15 is a perspective view of a developer container 230 including the storage unit 18 and the supply unit 200. The attachment portion 201 of the supply unit 200 and some members associated therewith are omitted in FIG. 15. As illustrated in FIG. 15, an opening 205 connected to the supply path portion 203 is formed in an inner wall of the toner receiving portion 202 having a cylindrical shape. The toner is guided from the toner receiving portion 202 to the supply path portion 203 through the opening 205, and is then stored into the storage unit 18 through the supply path portion 203.

Figure 16A:
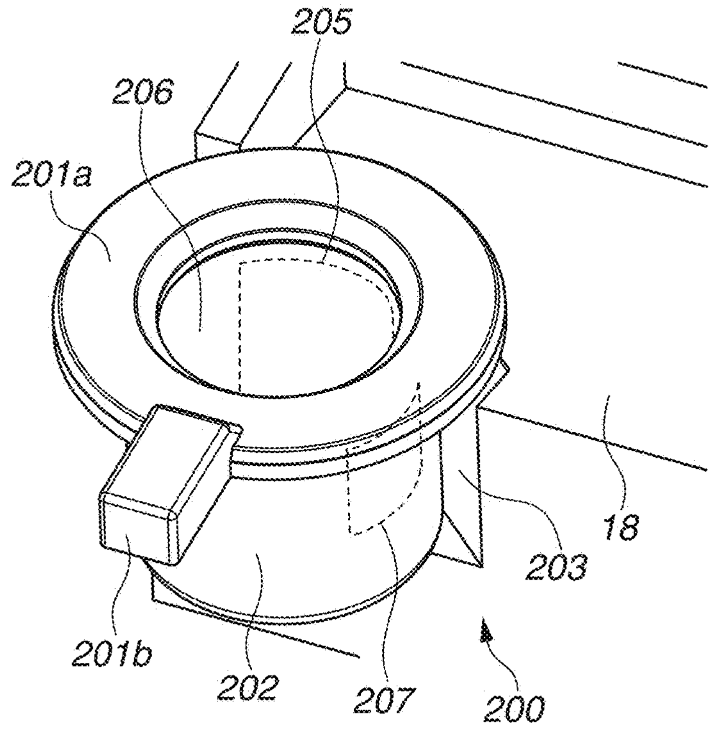
FIGS. 16A and 16B are an enlarged perspective view of the supply unit.
Figure 16B:
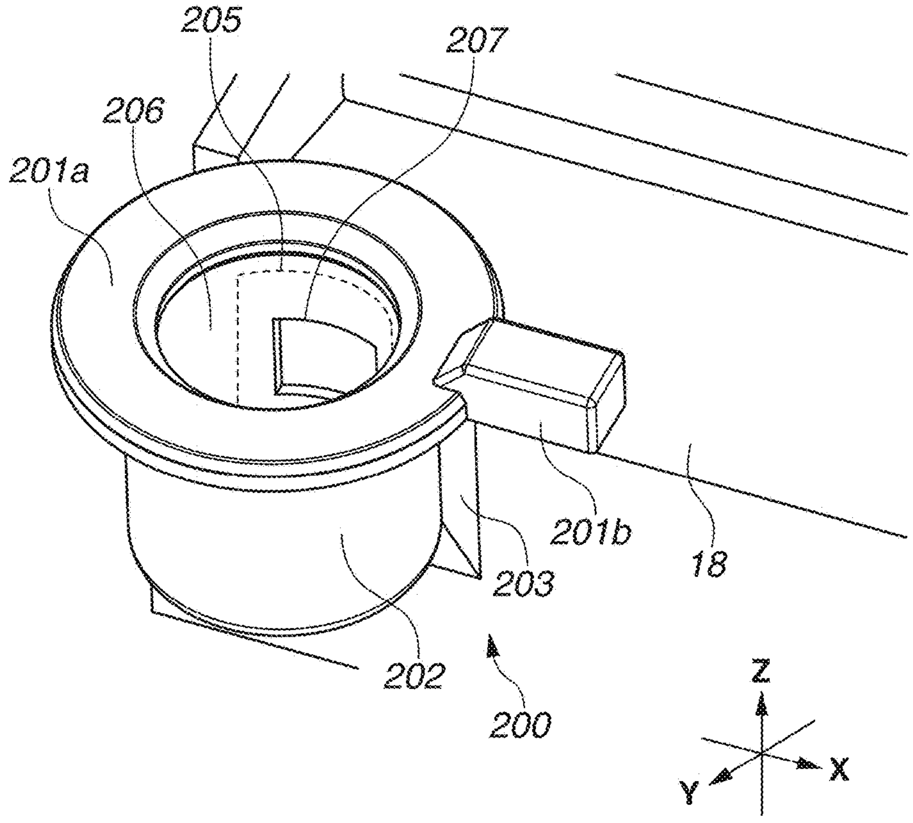

FIGS. 16A and 16B are enlarged perspective views of the supply unit 200. In FIG. 16A, the opening 205 formed in the toner receiving portion 202 is closed by a shutter portion 206, and the opening 205 is actually invisible and thus indicated by a dotted line. The shutter portion 206 is a cylindrical member concentric with the toner receiving portion 202, and disposed inside the toner receiving portion 202. An opening 207 through which the toner is to pass is also formed in the shutter portion 206. The opening 207 is disposed at a position where the opening is actually invisible and thus indicated by a dotted line in FIG. 16A. In FIG. 16A, the opening 205 and the opening 207 are not aligned and thus the opening 205 is closed.

The shutter portion 206 is fixed to the ring portion 201*a* and the lever portion 201*b*. The user holds and moves the lever portion 201*b* from a state illustrated in FIG. 16A to a state illustrated in FIG. 16B, so that the shutter portion 206 can be rotated inside the toner receiving portion 202. In FIG. 16B, the opening 205 and the opening 207 are disposed at positions overlapping each other, so that the opening 205 is open, meaning that the toner can be supplied through the opening 205.

In the process in which an image is formed on the recording material P, the toner is stirred in the storage unit 18 by a stirring member (not illustrated), and the opening 205 needs to be closed so that the toner will not leak out from the opening 205. The lever portion 201*b* is thus moved to be at the position illustrated in FIG. 16A during the image forming. This position will be referred to as an initial position or operating position of the lever portion 201*b*. On the other hand, it is necessary to open the opening 205 when the toner is supplied from the supply pack 210 to be described below to the storage unit 18. The lever portion 201*b* is thus moved to be at the position illustrated in FIG. 16B during the toner supply. This position will be referred to as a supply position of the lever portion 201*b*.

Figure 17:
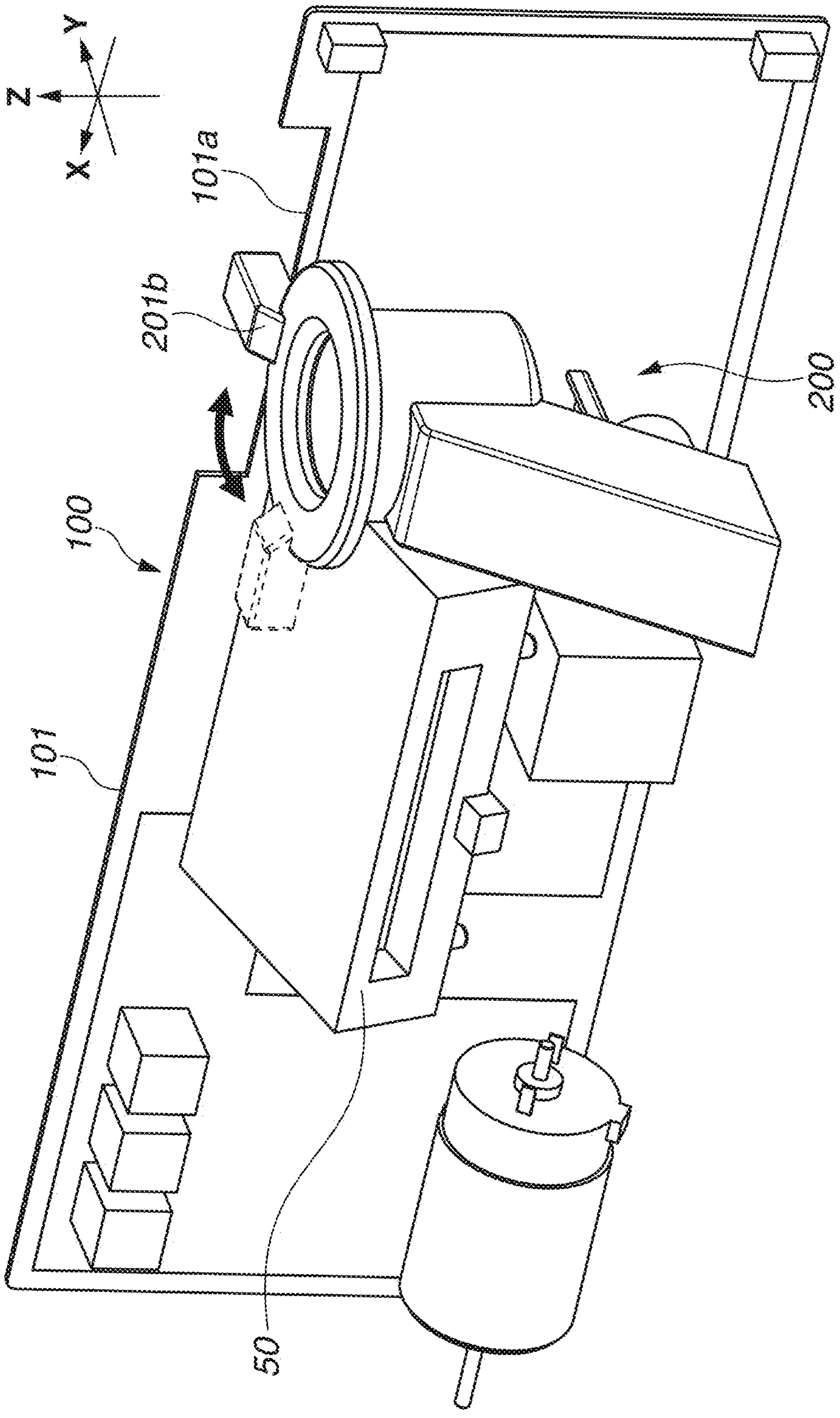
FIG. 17 is a perspective view illustrating a rotation locus of a lever portion.
Figure 18:
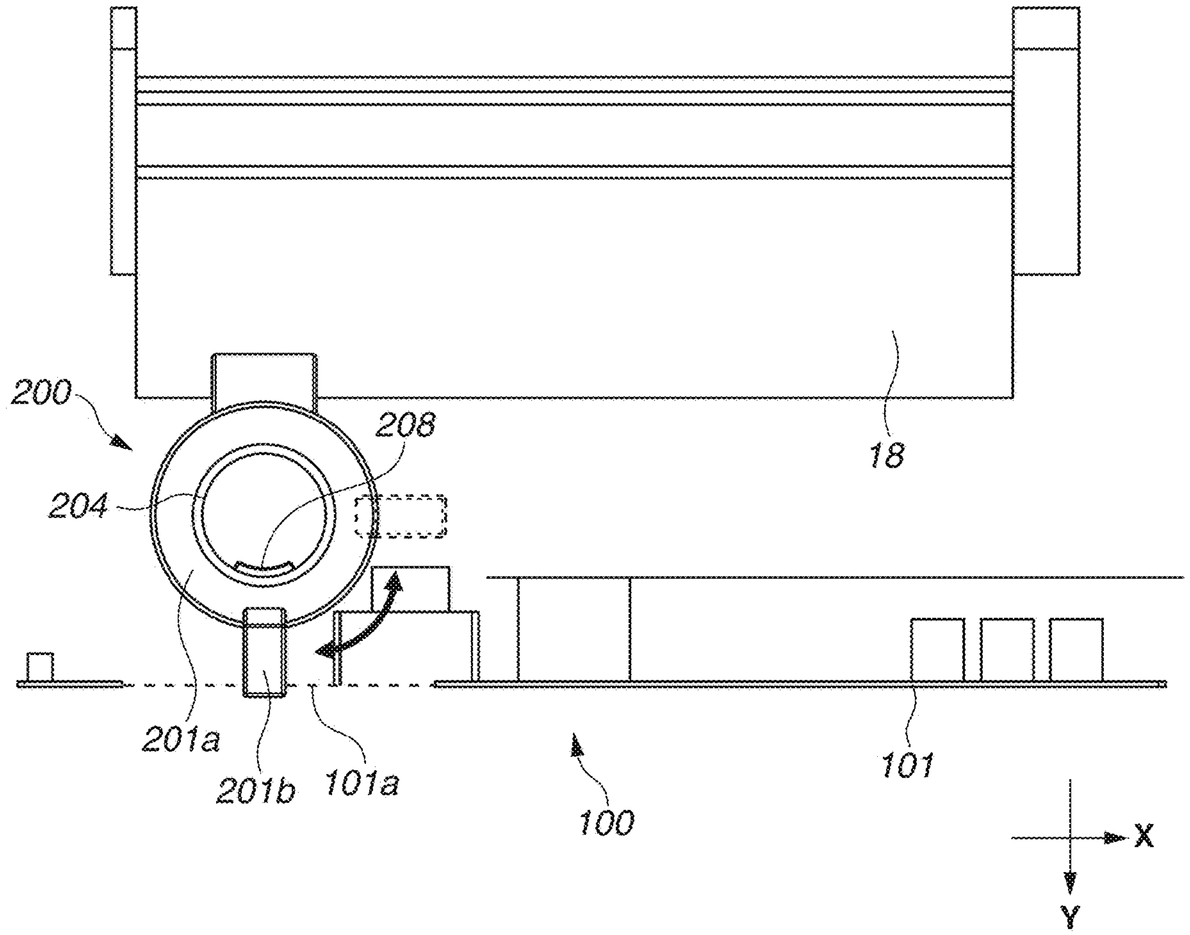
FIG. 18 is a top view illustrating the rotation locus of the lever portion.

Here, the size of the lever portion 201*b* is desirably as large as possible so that the user can easily hold the lever portion 201*b*. The circuit board 100 is located further on the front side than the supply unit 200 (i.e., on the plus side in the Y direction), and in the present exemplary embodiment, the supply unit 200 and the circuit board 100 are arranged at positions close to each other to reduce the size of the image forming apparatus 1 in the Y direction. As illustrated in FIG. 17 and FIG. 18, the wiring board 101 has a notch 101*a* formed at the upper end thereof such that the lever portion 201*b* does not contact the wiring board 101. FIG. 17 is a perspective view of the wiring board 101 when viewed from the back side of the main body, and FIG. 18 is a top view thereof. In FIG. 18, the position corresponding to the notch 101*a* is indicated by a dotted line. The lever portion 201*b* at the initial position overlaps the wiring board 101. As illustrated in these figures, the notch 101*a* is provided at the position corresponding to the rotation trajectory of the lever portion 201*b*. In the present exemplary embodiment, although the wiring board 101 is provided with the notch 101*a*, a through-hole or groove may be provided in the wiring board 101 so that the lever portion 201*b* does not interfere with the wiring board 101.

As illustrated in FIG. 18, an alignment rib 208 is disposed inside the supply port 204. The role of the alignment rib 208 will be described in detail below.

Configuration of Supply Container

Next, a configuration of the supply pack 210 (a supply container) will be described with reference to FIGS. 19A and 19B. The supply pack 210 includes a pouch portion 211 containing the toner for supply, a cylindrical insertion portion 212 to be inserted into the supply port 204, an opening 213 formed in a side surface of the insertion portion 212 to allow the toner to go in and out, and a shutter portion 214 for closing the opening 213 to prevent the toner from leaking out from the opening 213. The supply pack 210 further includes a pack bottom portion 215 having a truncated cone shape, and the pack bottom portion 215 is fixed to the insertion portion 212. The pouch portion 211 becomes flatter toward the end opposite to the insertion portion 212, and a pouch end portion 216 extending in a predetermined direction is formed at the end.

The shutter portion 214 is a cylindrical member concentric with the insertion portion 212, and located on the outer side of the insertion portion 212. The shutter portion 214 can rotate around the insertion portion 212. Although not illustrated, an opening is also formed in the shutter portion 214, and the toner can be supplied from the supply pack 210 when the shutter portion 214 rotates and the opening of the shutter portion 214 and the opening 213 of the insertion portion 212 align with each other.

Figure 19A:
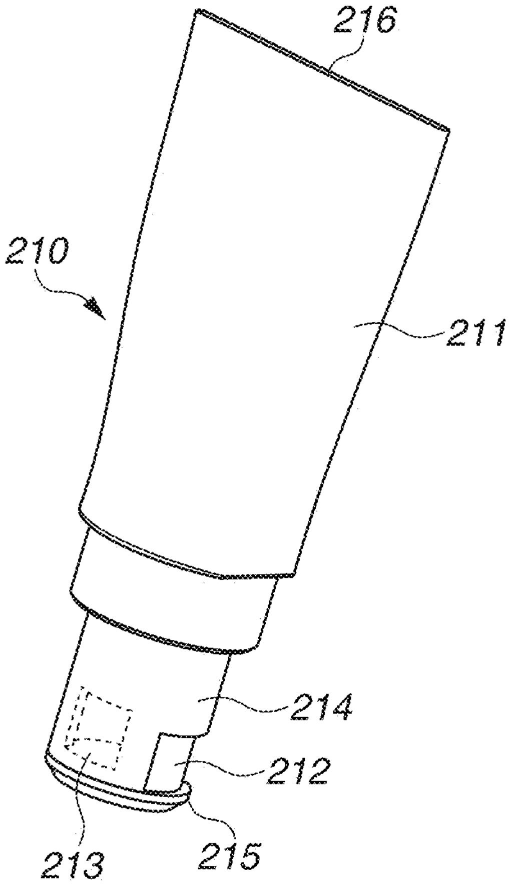
FIGS. 19A and 19B are diagrams illustrating a configuration of a supply pack.
Figure 19B:
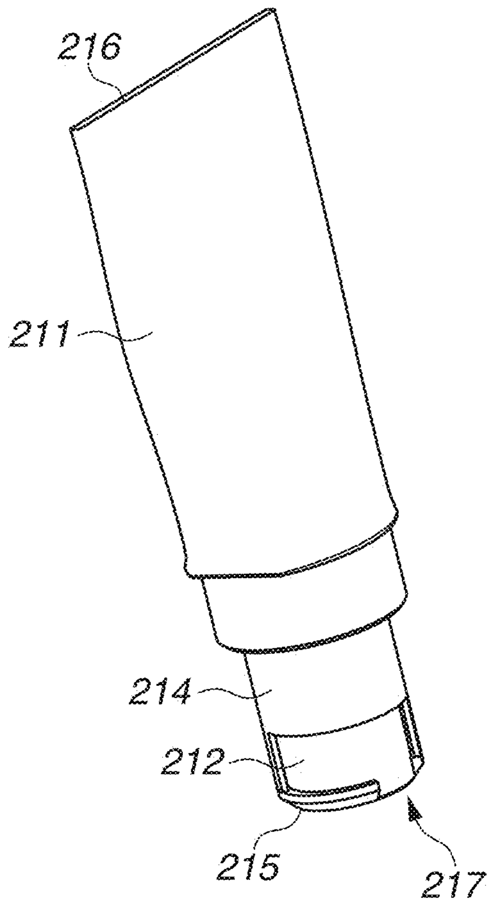

In FIG. 19A, the opening 213 formed in the insertion portion 212 is covered by the shutter portion 214 and thus is actually invisible; the opening 213 is indicated by a dotted line. FIG. 19B illustrates the supply pack 210 when viewed from an angle different from that in FIG. 19A. An alignment notch 217 is formed in a part of the pack bottom portion 215. The role of the alignment notch 217 will be described in detail below.

Procedure of Attaching Supply Container

Figure 20A:
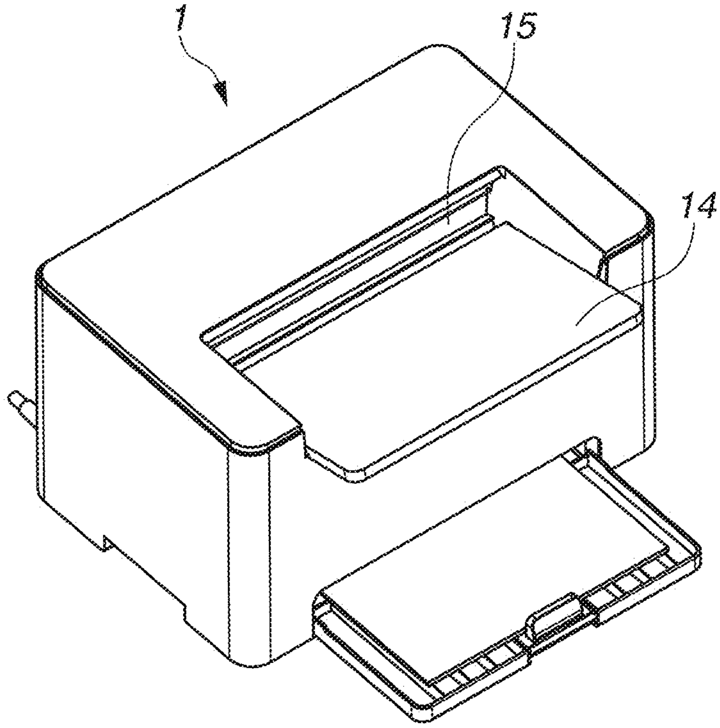
FIGS. 20A and 20B are a perspective view illustrating a closed state of a discharge tray and a perspective view illustrating an open state of the discharge tray, respectively.
Figure 20B:
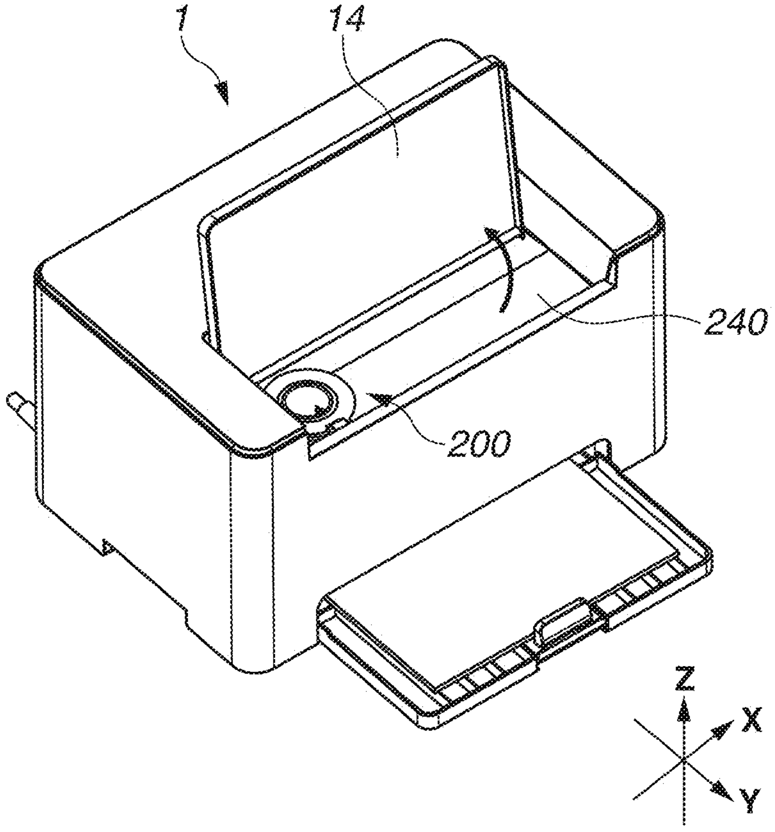

Next, a toner supply procedure using the supply pack 210 will be described with reference to FIGS. 20A and 20B to FIG. 22. FIGS. 20A and 20B illustrate perspective views of the image forming apparatus 1. In the present exemplary embodiment, the discharge tray 14 is configured to move between a position for covering the supply unit 200 as illustrated in FIG. 20A so that the recording materials P discharged from the discharge port 15 can be stacked thereon, and a position for exposing the supply unit 200 as illustrated in FIG. 20B. The supply unit 200 is provided in the upper part on the front surface side of the main body of the image forming apparatus 1 and thus can be easily accessed by the user during the supply operation.

When the toner is supplied, the recording materials P stacked on the discharge tray 14 are removed, and the discharge tray 14 is opened and moved to the position illustrated in FIG. 20B. When the discharge tray 14 is open, the supply unit 200 and a top surface portion 240 adjacent to the supply unit 200 are exposed. Subsequently, the supply pack 210 is inserted into the exposed supply unit 200. In this process, the supply pack 210 is inserted such that the position of the alignment rib 208 (FIG. 18) in the supply unit 200 and the position of the alignment notch 217 (FIG. 19B) in the supply pack 210 align with each other. In a case where the alignment rib 208 and the position of the alignment notch 217 do not align with each other, the pack bottom portion 215 interferes with the alignment rib 208, so that the supply pack 210 cannot be inserted.

Figure 21A:
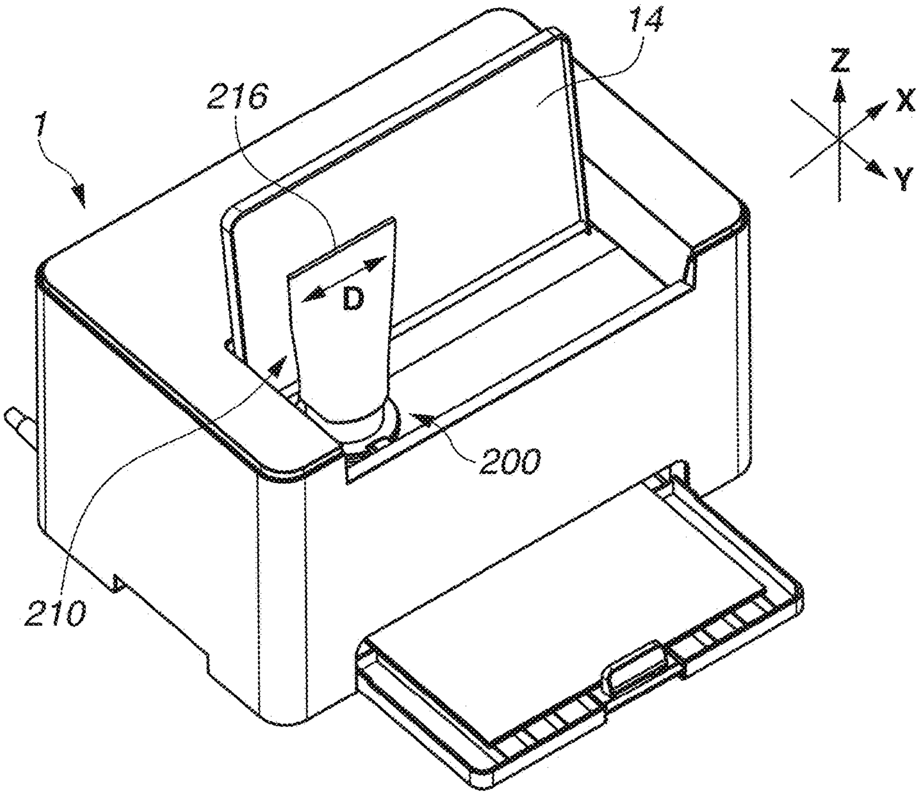
FIGS. 21A and 21B are perspective views illustrating a state where the supply pack is attached.

FIG. 21A illustrates a state where the supply pack 210 is inserted into the supply unit 200. In the present exemplary embodiment, as illustrated in FIG. 21A, the supply pack 210 can be inserted into the supply unit 200 when the supply pack 210 is oriented in such a manner that a direction D in which the pouch end portion 216 extends is parallel to the X direction. When the supply pack 210 is inserted deep into the supply unit 200, the shutter portion 206 (FIGS. 16A and 16B) of the supply unit 200 and the shutter portion 214 (FIGS. 19A and 19B) of the supply pack 210 are engaged with each other by an engagement mechanism (not illustrated).

Figure 21B:
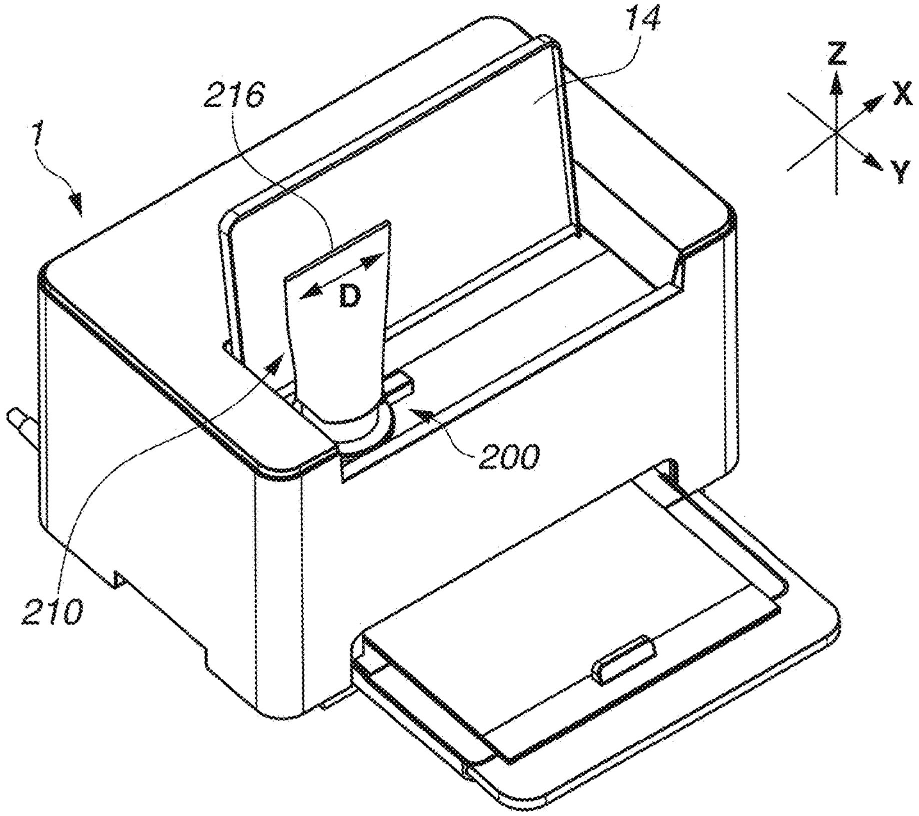

FIG. 21B illustrates a state where the lever portion 201*b* is moved to the supply position from the initial position. In this state, the supply pack 210 is fixed to the supply unit 200 by a lock mechanism (not illustrated). As described above, the shutter portion 206 of the supply unit 200 is rotated by moving the lever portion 201*b*. The shutter portion 206 of the supply unit 200 and the shutter portion 214 of the supply pack 210 are engaged with each other, and thus the shutter portion 214 rotates together with the shutter portion 206. As a result, by moving the lever portion 201*b*, the opening 205 (FIGS. 16A and 16B) formed in the toner receiving portion 202 opens and the opening 213 (FIG. 19A) formed in the insertion portion 212 also opens. The opening 205 formed in the toner receiving portion 202 and the opening 213 formed in the insertion portion 212 are in such a positional relationship that these openings face each other when the supply pack 210 is inserted into the supply unit 200. Thus, when the lever portion 201*b* is moved from the initial position to the supply position, the supply pack 210, the supply unit 200, and the storage unit 18 are connected, so that the toner can be supplied.

Figure 22:
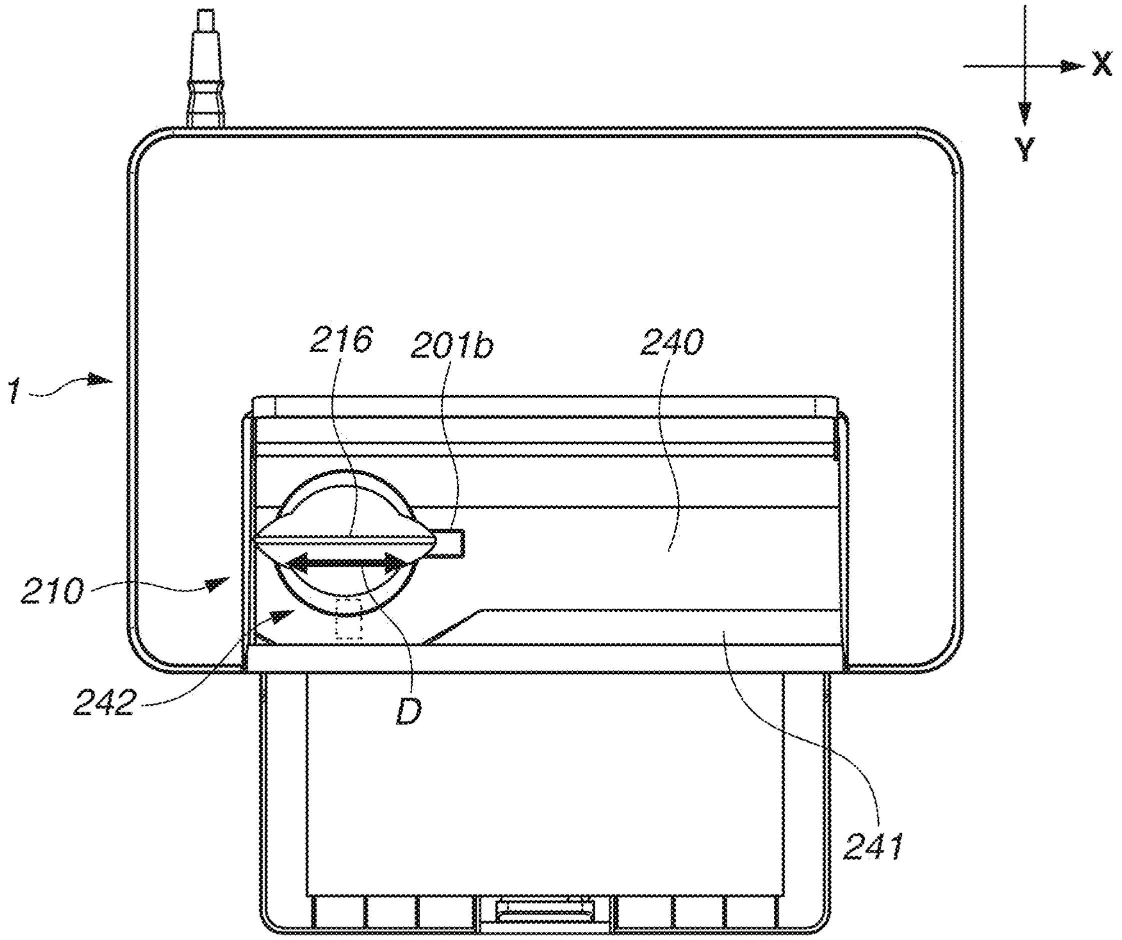
FIG. 22 is a top view illustrating the state where the supply pack is attached.

FIG. 22 is a top view of the image forming apparatus 1 when viewed from above in the state illustrated in FIG. 21B. Looking at the supply pack 210 attached to the image forming apparatus 1, the direction D in which the pouch end portion 216 extends is parallel to the X direction, as described above. Further, a protrusion 241 protruding to the plus side (the upper side) in the Z direction is formed at the end on the plus side (the front surface side) in the Y direction of the top surface portion 240 exposed by opening the discharge tray 14. A notch 242 is formed in a part of the protrusion 241, and the position of the notch 242 corresponds to the rotation trajectory of the lever portion 201*b*. The lever portion 201*b* at the initial position is indicated by a dotted line in FIG. 22.

Upon completion of the toner supply, the lever portion 201*b* is operated to return to the initial position. At this time, in the manner opposite to the operation of moving the lever portion 201*b* to the supply position, the shutter portion 206 of the supply unit 200 and the shutter portion 214 of the supply pack 210 both rotate, and both of the opening 205 and the opening 213 are then closed. As a result, the supply unit 200 and the supply pack 210 are unlocked, and the supply pack 210 can be removed from the supply unit 200. In a case where the supply pack 210 is not inserted into the supply unit 200 of the image forming apparatus 1, the shutter portion 214 is closed and a leakage of the toner can be prevented.

MODIFICATION EXAMPLES

Modification Example Relating to Circuit Board

In the above-described exemplary embodiment, the low-voltage power supply unit 110 and the high-voltage power supply unit 120 are described to be on the same board (the circuit board 100), but the exemplary embodiment is not limited to such a configuration. These two power supply units may be provided on different boards. Further, both of the board on which the low-voltage power supply unit 110 is provided and the board on which the high-voltage power supply unit 120 is provided may be on the front surface side of the image forming apparatus 1 illustrated in FIG. 3. Alternatively, only the board on which the low-voltage power supply unit 110 is provided may be on the front surface side, and the board on which the high-voltage power supply unit 120 is provided may be at a different position.

Yet alternatively, only the board on which the high-voltage power supply unit 120 is provided may be on the front surface side, and the board on which the low-voltage power supply unit 110 is provided may be at a different position. In this case, however, it is desirable that the electronic components 121, which are large in size in the Y direction and mounted on the high-voltage power supply unit 120, be disposed to avoid the position of each of the optical box 50 and the drive motor 60.

In the above-described exemplary embodiment, the distance L1 between the inner surface of the right-side plate frame 72 and the inner surface of the left-side plate frame 73 in the X direction is described to be shorter than the length L2 of the circuit board 100 in the X direction as illustrated in FIG. 4. However, the exemplary embodiment is not limited to such a configuration. For example, the distance L1 described above may be longer than or equal to the length L2. Furthermore, the wiring board 101 may be disposed on the minus side (the back surface side) in the Y direction of the bent portions 72*a* and 73*a*. In other words, the wiring board 101 may be disposed in the area between the inner surface of the right-side plate frame 72 and the inner surface of the left-side plate frame 73.

In the above-described exemplary embodiment, the part of the low-voltage power supply unit 110 is mounted at the position overlapping the optical box 50 (the position facing the optical box 50 in the Y direction) when the circuit board 100 is viewed from the back surface of the main body, as illustrated in FIG. 9 and FIG. 10. The exemplary embodiment is however not limited to this configuration. Another circuit such as the high-voltage power supply unit 120 may be mounted at the position overlapping the optical box 50, or the circuit board 100 may not be mounted at this position in the first place.

In the above-described exemplary embodiment, the configuration in which the feeding cassette 4 can be drawn from the main body of the image forming apparatus 1 is described as an example, but the exemplary embodiment is not limited to this configuration. There may be adopted a tray that cannot be drawn from the image forming apparatus 1 and enables a user to insert the recording material P directly into the feeding port 81 formed on the front surface of the image forming apparatus 1.

Furthermore, as illustrated in FIG. 1 and FIG. 2, the front cover 70 is provided on the same side (the front surface side) as the side where the feeding port 81 is located. In the configuration of the present exemplary embodiment, the feeding direction and the discharge direction are opposite directions and parallel to each other. Thus, it can be expressed that the front cover 70 is located upstream of the optical box 50 in the feeding direction.

In the above-described exemplary embodiment, as illustrated in FIG. 7, the optical box 50 overlaps at least parts of the electronic components 111 when viewed from the vertical direction, but the positional relationship between the optical box 50 and the electronic components 111 is not limited thereto. The optical box 50 and the electronic components 111 may be arranged not to align each other in the X direction to some extent. That is, the optical box 50 and the electronic components 111 may be in such a relationship that the optical box 50 and the electronic components 111 do not overlap each other when viewed from the vertical direction, but the optical box 50 and at least parts of the electronic components 111 overlap each other when viewed from a direction parallel to the XZ plane and intersecting the vertical direction. In other words, the optical box 50 and at least parts of the electronic components 111 may overlap each other when viewed from a direction orthogonal to the discharge direction and the feeding direction. In such a configuration as well, the distance between the circuit board 100 and the optical box 50 in the Y direction (the front-back direction) can be reduced, so that the image forming apparatus 1 can be downsized.

Figure 23:
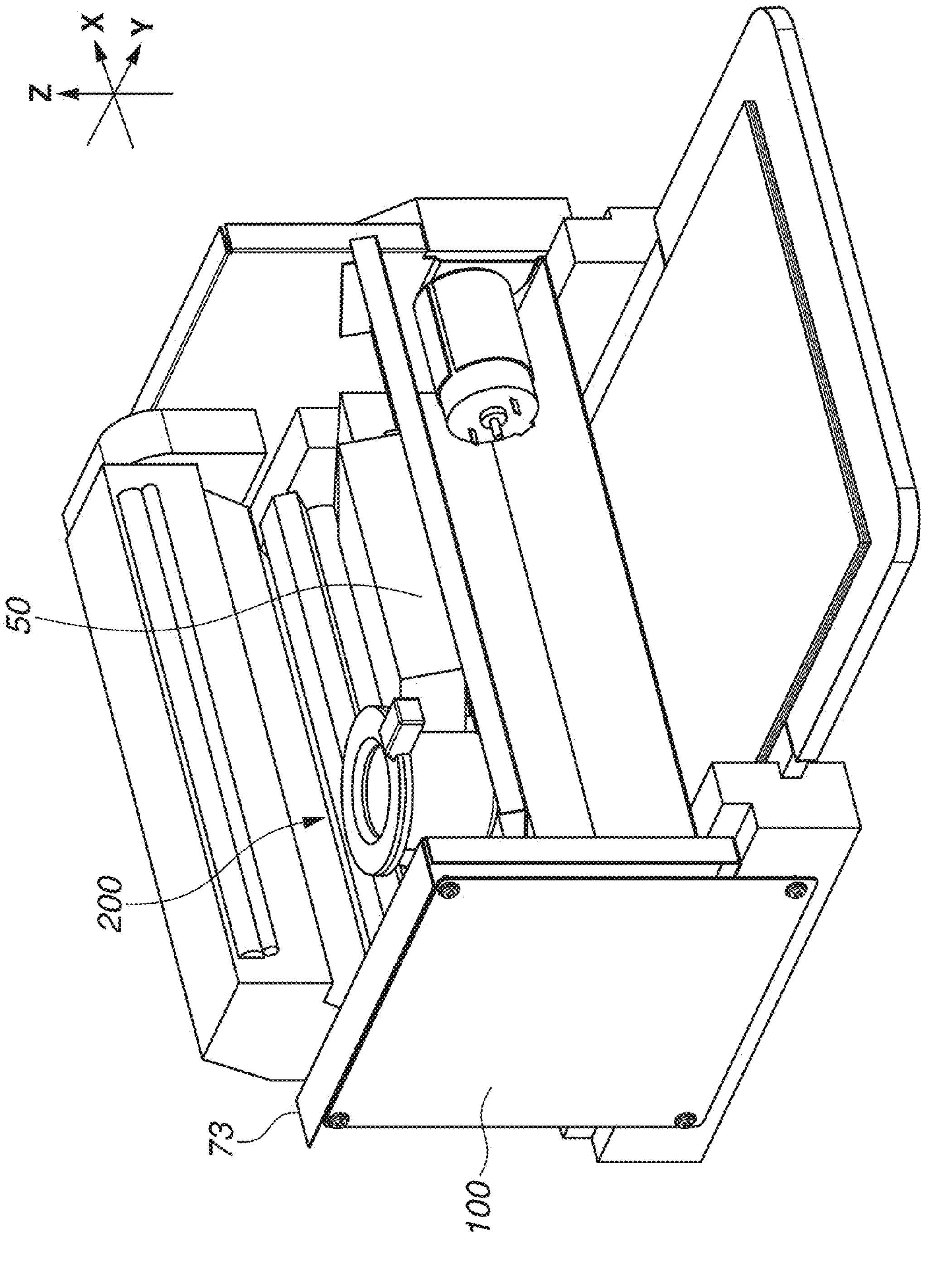
FIG. 23 is a perspective view illustrating a configuration in which the circuit board is attached on a side surface.

In the above-described exemplary embodiment, the circuit board 100 is described to be on the front surface side of the image forming apparatus 1, but is not limited to this configuration. The circuit board 100 may be on the side surface of the image forming apparatus 1 as illustrated in FIG. 23. In FIG. 23, the circuit board 100 is disposed on the outer side of the left-side plate frame 73.

In a case where the circuit board 100 is disposed on the front surface side of the image forming apparatus 1, the arrangement of the electronic components 111 and 121, which are tall components, is limited to avoid the optical box 50. However, in a case where the circuit board 100 is on the outer side of the left-side plate frame 73 as illustrated in FIG. 23, the limitation to the arrangement of the electronic components 111 and 121 is reduced, so that the area of the board can be smaller than in the configuration in which the circuit board 100 is disposed on the front surface side.

In addition, in a case where the circuit board 100 is disposed on the side surface, the supply unit 200 can be disposed closer to the front surface because there is no need for the space for disposing the circuit board 100 on the front surface side of the image forming apparatus 1. This improves accessibility to the supply unit 200, thereby increasing usability. The circuit board 100 may be on the outer side of the right-side plate frame 72.

Modification Example Relating to Orientation for Attaching Supply Container

In the above-described exemplary embodiment, when the supply pack 210 is attached to the supply unit 200, the supply pack 210 is oriented in such a manner that the direction D in which the pouch end portion 216 extends is parallel to the X direction. However, the orientation of the supply pack 210 is not limited thereto. When the supply pack 210 is attached, the direction D in which the pouch end portion 216 extends may intersect the X direction.

Figure 24:
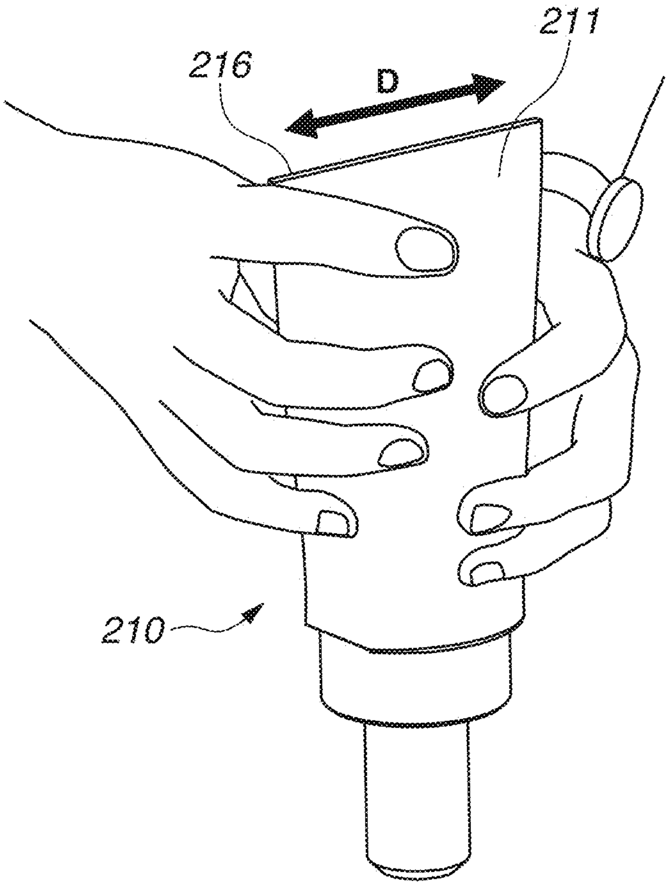
FIG. 24 is a diagram illustrating how toner is supplied from the supply pack.

FIG. 24 is a diagram illustrating how the user supplies the toner in a state where the supply pack 210 is attached to the supply unit 200. As described above, since the pouch portion 211 has the shape that becomes flatter toward the pouch end portion 216, it is easy to hold the pouch portion 211 in the user's hands. The user supplies the toner from the supply pack 210 by kneading the pouch portion 211.

In view of the supply method in FIG. 24, it is desirable that the orientation of the supply pack 210 in attaching the supply pack 210 to the supply unit 200 falls within a certain range. Specifically, it is desirable that the angle at which the direction D in which the pouch end portion 216 extends intersects the plus side in the X direction falls within the range from +45 degrees to −45 degrees.

Figure 25A:
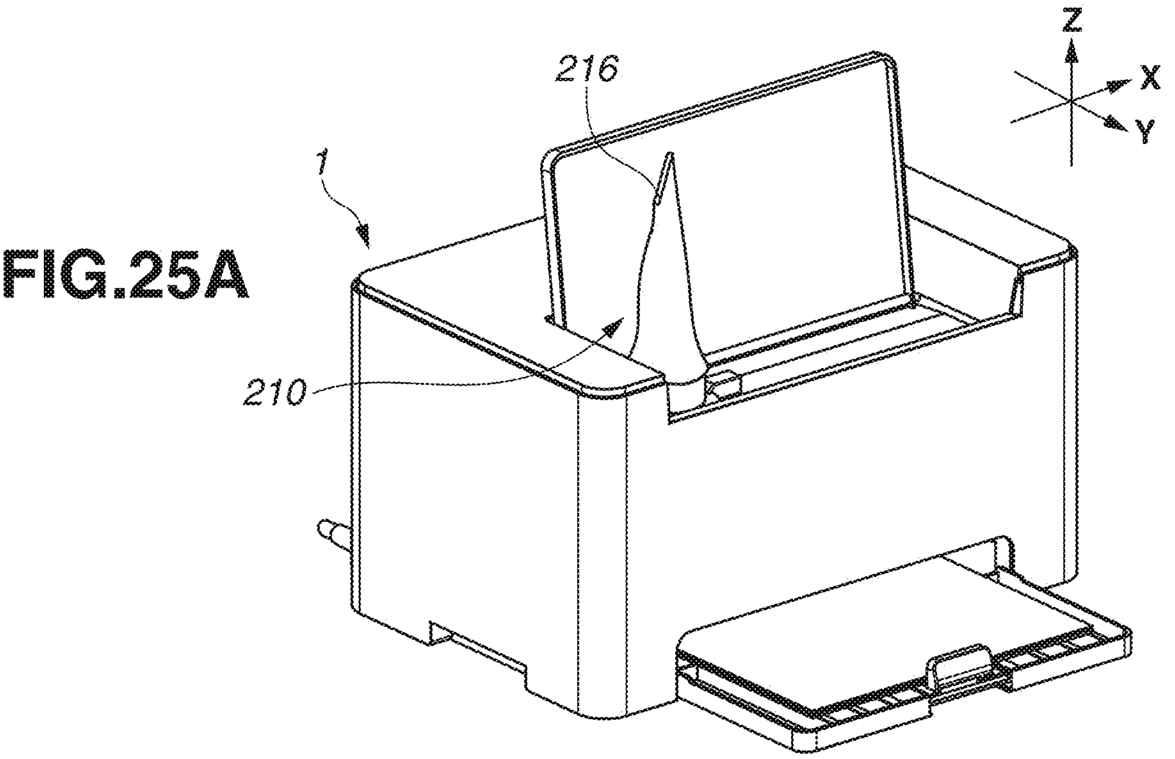
FIGS. 25A and 25B are diagrams illustrating a first modification example relating to an orientation for attaching the supply pack.
Figure 25B:
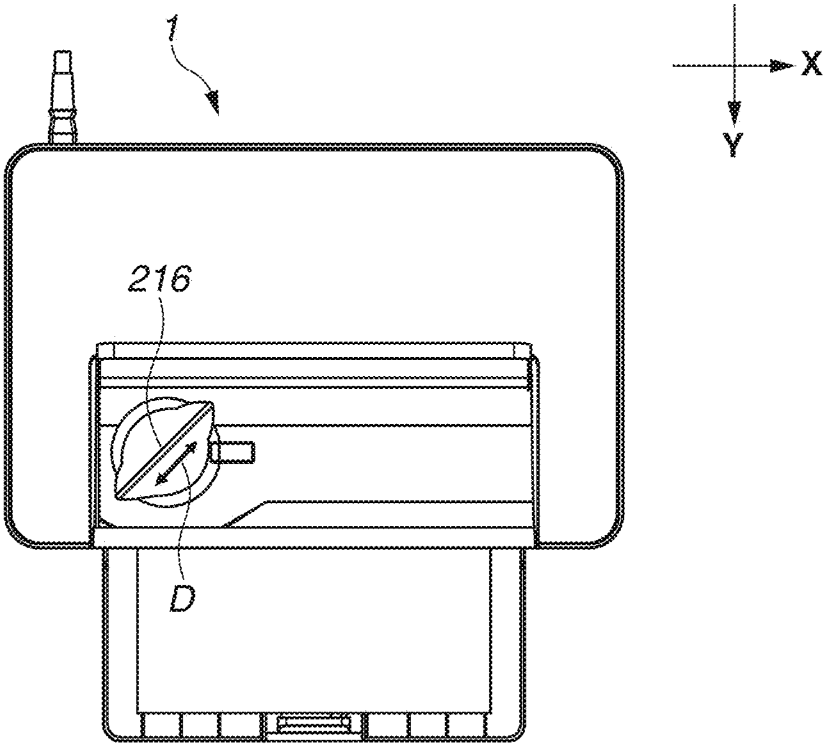

FIGS. 25A and 25B illustrate a state where the angle at which the direction D in which the pouch end portion 216 extends intersects the plus side in the X direction is +45 degree. FIG. 25A illustrates a perspective view of the image forming apparatus 1 in a state where the supply pack 210 is attached to the supply unit 200, and FIG. 25B illustrates a top view thereof in the same state.

Figure 26A:
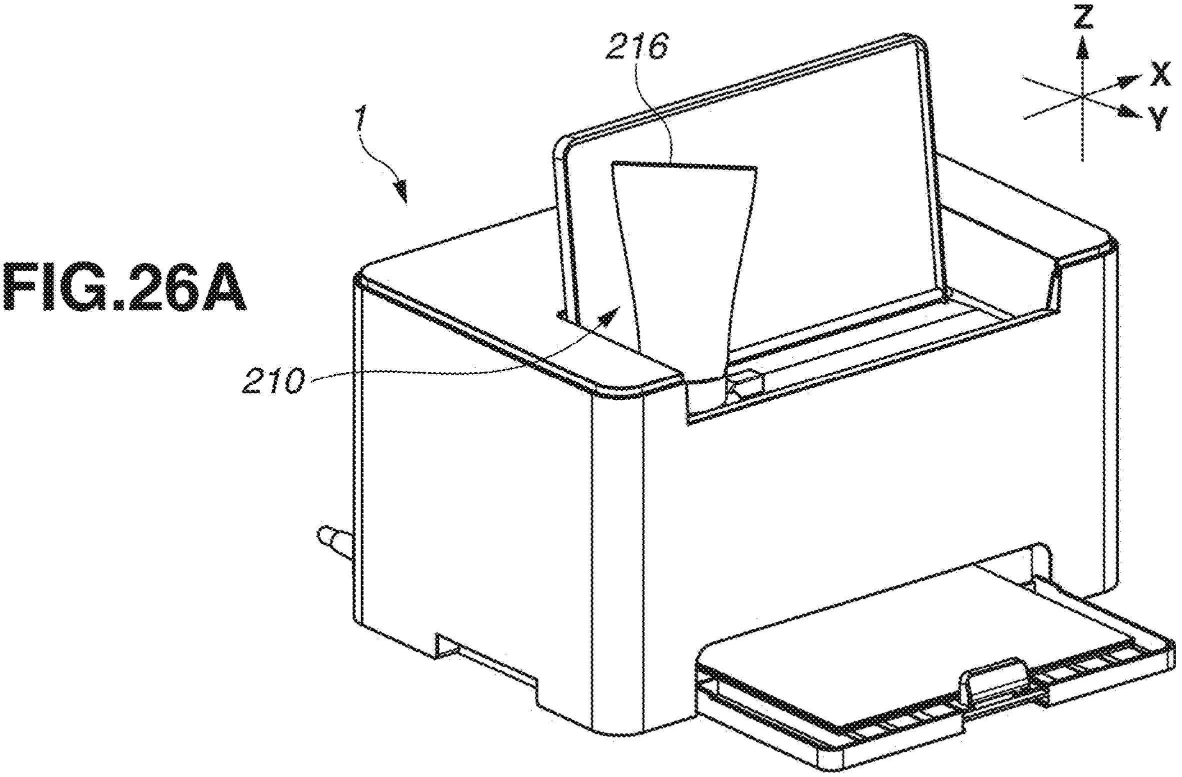
FIGS. 26A and 26B are diagrams illustrating a second modification example relating to the orientation for attaching the supply pack.
Figure 26B:
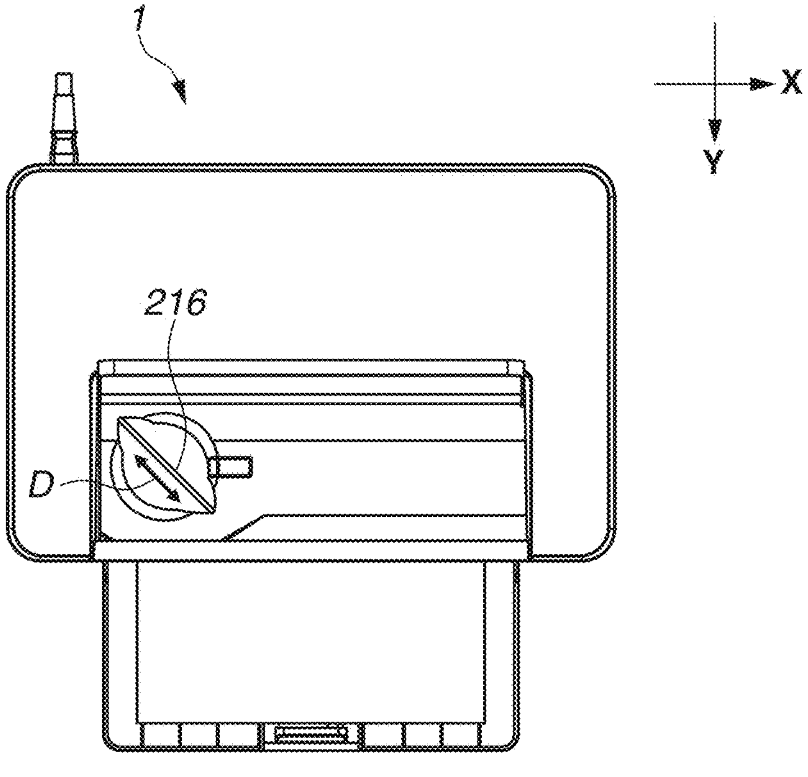

FIGS. 26A and 26B illustrate a state where the angle at which the direction D in which the pouch end portion 216 extends intersects the plus side in the X direction is −45 degrees. FIG. 26A illustrates a perspective view of the image forming apparatus 1 in a state where the supply pack 210 is attached to the supply unit 200, and FIG. 26B illustrates a top view thereof in the same state.

If the orientation of the supply pack 210 falls within the above-described angle range, it is easy for the user to hold the pouch portion 211 in the hands and supply the toner from the supply pack 210.

Modification Example Relating to Color-Image Forming Apparatus

In the above-described exemplary embodiment, the monochrome laser beam printer is described as an example of the image forming apparatus 1. The present exemplary embodiment is however not limited thereto. The present exemplary embodiment may be also applied to a color laser beam printer. A configuration of an image forming apparatus 300 that is a color laser beam printer will be described with reference to FIG. 27A to FIG. 31. The main part of the color laser beam printer (image forming apparatus 300) is similar to that of the monochrome laser beam printer, and thus only a different part will be described.

Figure 27A:
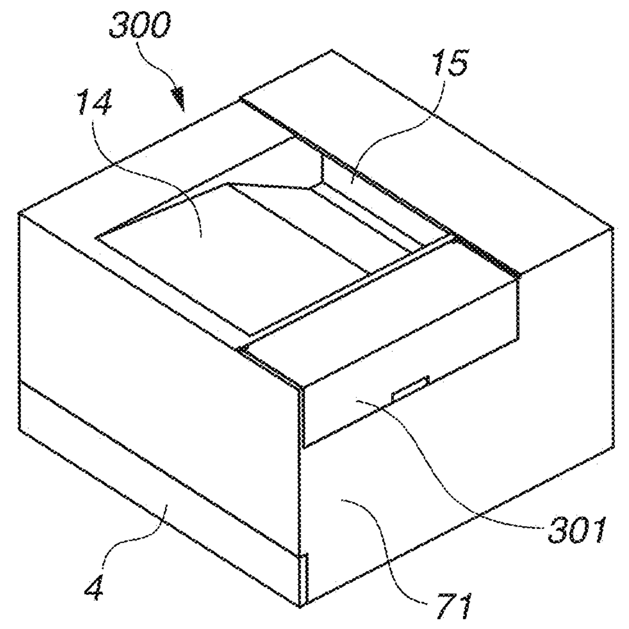
FIGS. 27A and 27B are perspective views of a color laser beam printer.
Figure 27B:
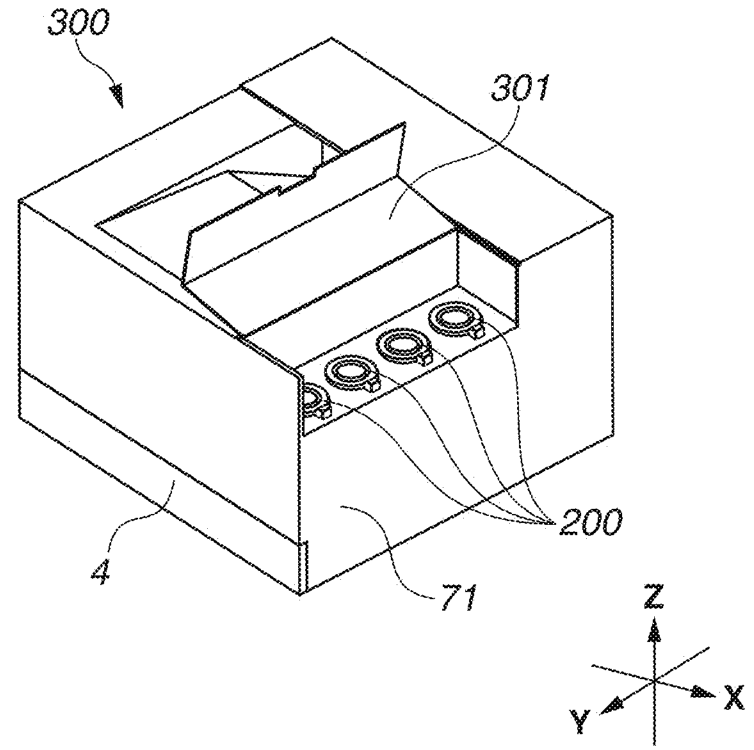

FIGS. 27A and 27B are perspective views of the image forming apparatus 300. As illustrated in FIG. 27A, the image forming apparatus 300 includes the feeding cassette 4, the discharge tray 14, the discharge port 15, and the exterior cover 71 as with the image forming apparatus 1. Unlike the image forming apparatus 1, the image forming apparatus 300 includes a supply unit cover 301 that covers the supply unit 200. FIG. 27B illustrates a state where the supply unit cover 301 is open. The supply unit cover 301 is disposed at a position adjacent to the discharge tray 14, and is configured to open and close by rotating about a rotation axis extending in the Y direction. The supply unit cover 301 is configured to be opened toward the minus side in the X direction, i.e., toward the discharge tray 14, and therefore, there is no need to have an extra space for opening the cover on the outer side of the image forming apparatus 300. In other words, a space to be occupied by the image forming apparatus 300 can be smaller.

Figure 28:
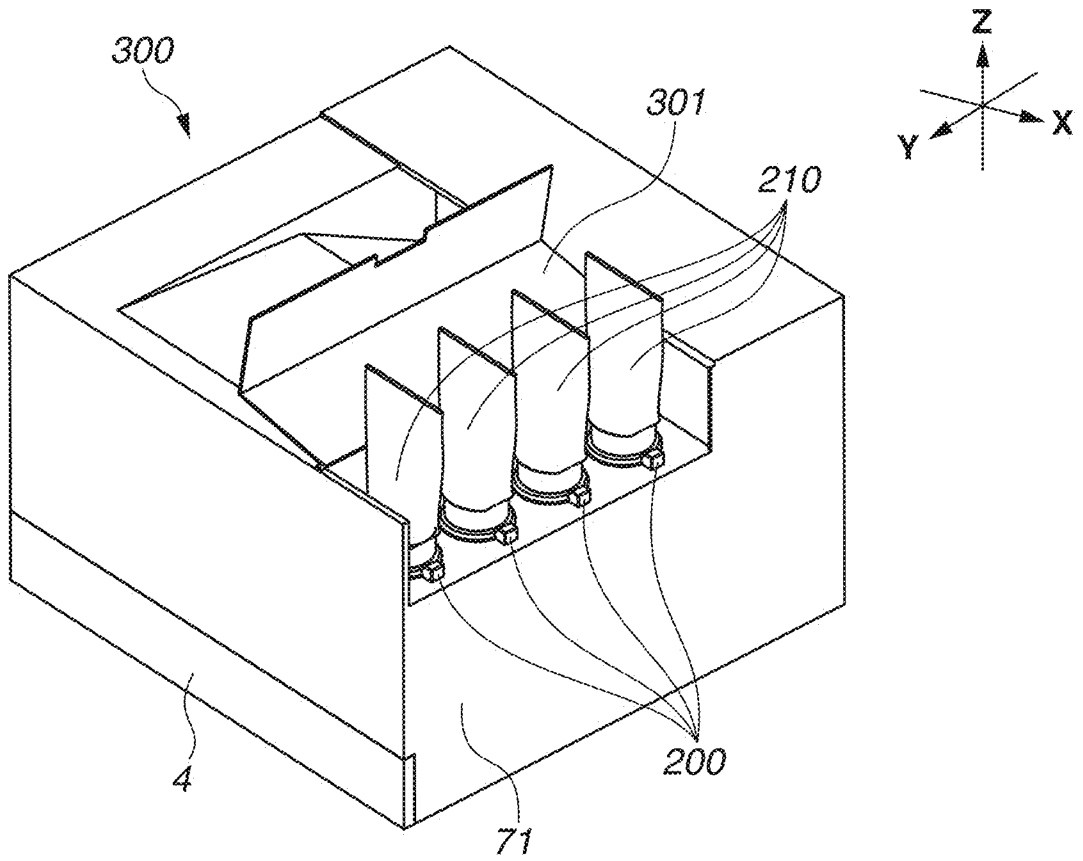
FIG. 28 is a perspective view illustrating a state where supply packs are attached to the color laser beam printer.

The image forming apparatus 300 includes four supply units 200 as illustrated in FIG. 27B, from which toners of yellow, magenta, cyan, and black can be supplied. FIG. 28 is a perspective view of the image forming apparatus 300 in a state where supply packs 210 are attached to the four supply units 200. As illustrated in FIG. 28, the four supply packs 210 can be attached to the image forming apparatus 300 at a time.

Figure 29:
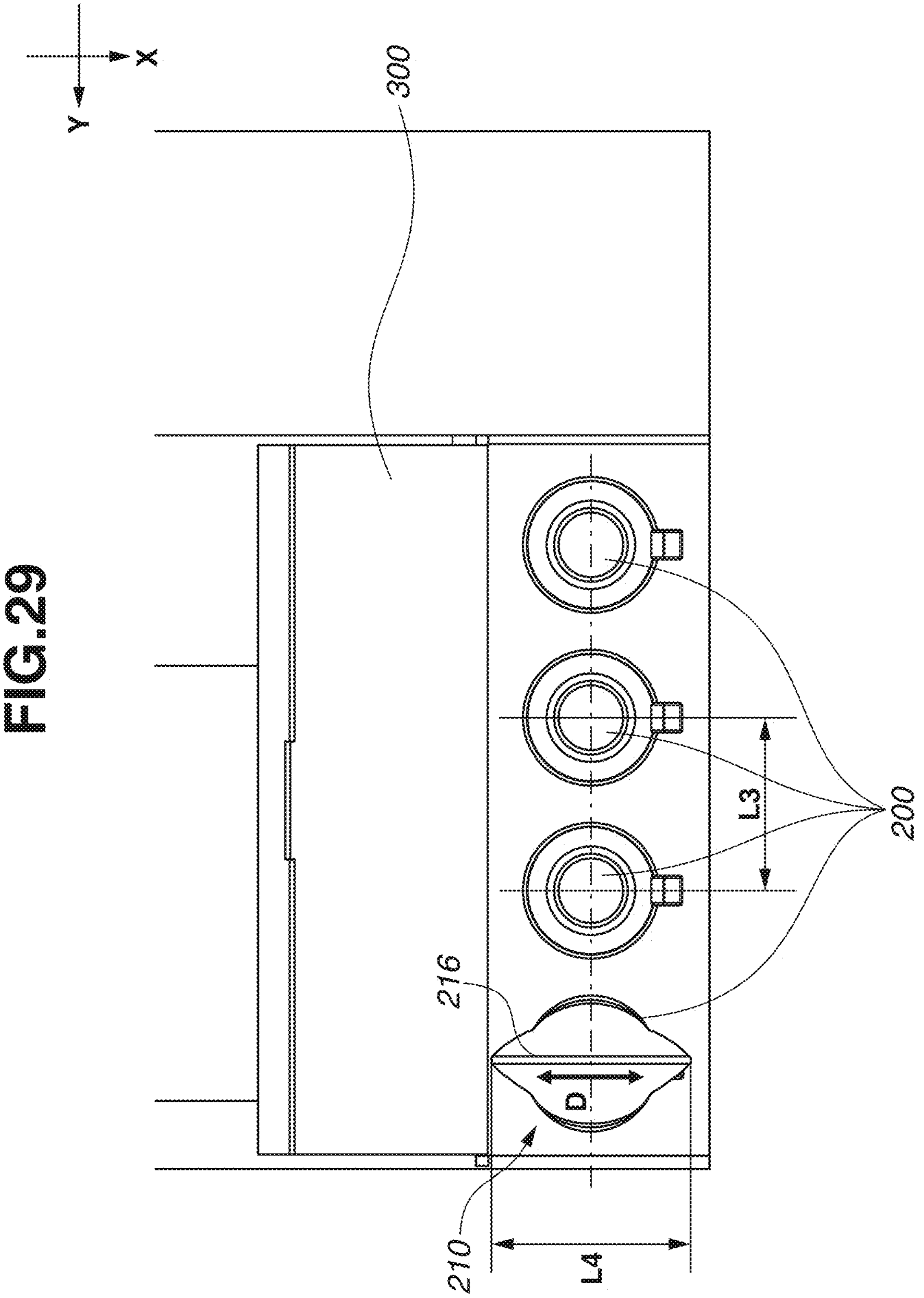
FIG. 29 is a top view illustrating a state where the supply packs are attached to the color laser beam printer.

FIG. 29 is a top view of the image forming apparatus 300 in a state where one supply pack 210 is attached to one of the supply units 200. As illustrated in FIG. 29, the supply pack 210 is configured to be attached to the supply unit 200 in such an orientation that the direction D in which the pouch end portion 216 extends is parallel to the X direction. The direction D in which the pouch end portion 216 extends is orthogonal to a direction (the Y direction) in which the plurality of supply units 200 is aligned. Such a configuration allows the plurality of supply packs 210 to be attached at a time to the supply units 200 adjacent to each other, without interfering with each other.

Furthermore, the configuration in which the supply packs 210 are attached in such an orientation also produces an advantage that the image forming apparatus 300 can be downsized. In FIG. 29, the distance between the centers of the respective supply units 200 is L3, and the maximum width (the length of the pouch end portion 216) of each supply pack 210 is L4. Attaching the supply pack 210 in the orientation illustrated in FIG. 29 can reduce the distance between the centers of the respective supply units 200 to satisfy $L3<L4$, so that the size in the Y direction can be reduced.

The orientation of the supply pack 210 is not limited to the direction illustrated in FIG. 29 if the plurality of supply packs 210 can be attached to the supply units 200 adjacent to each other. Any orientation is acceptable if an angle at which the direction D in which the pouch end portion 216 extends intersects the plus side in the X direction falls within the range from +45 degree to −45 degrees based on the state illustrated in FIG. 29.

Figure 30:
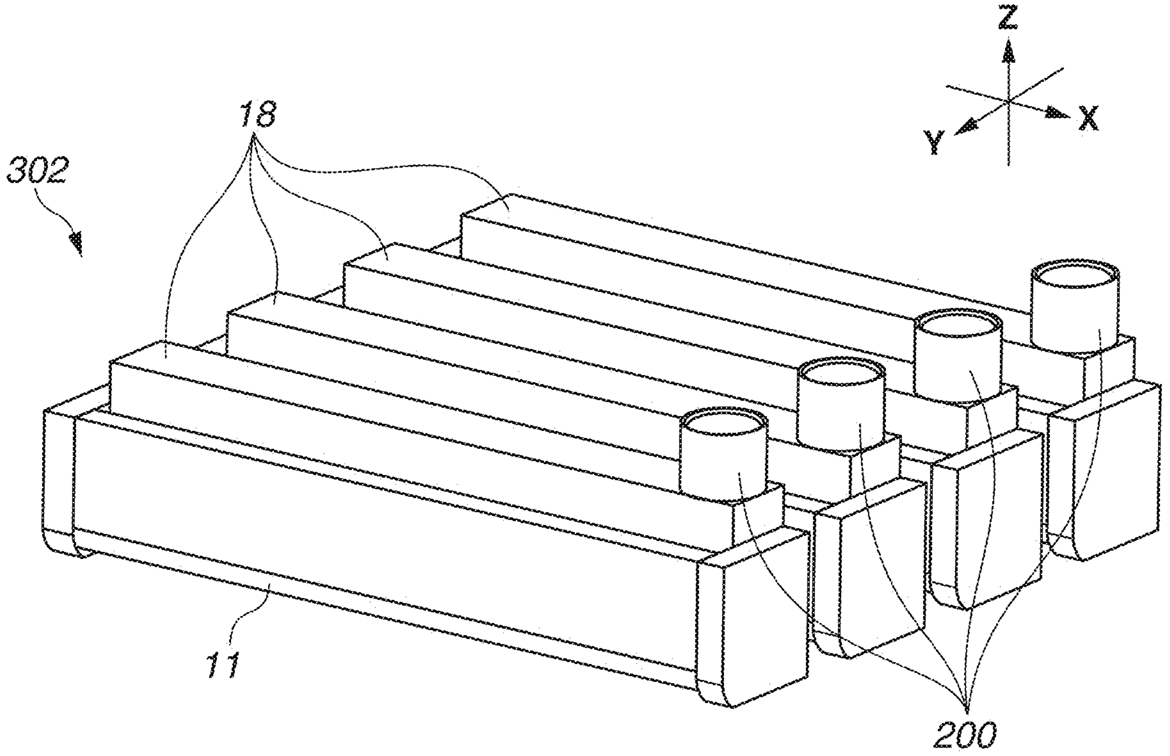
FIG. 30 is a perspective view of a plurality of process units.

FIG. 30 is a perspective view of process units 302 included in the image forming apparatus 300. The image forming apparatus 300 includes the process units 302 corresponding to four colors of yellow, magenta, cyan, and black. Each of the process units 302 includes the supply unit 200, the storage unit 18, and the photosensitive drum 11. The photosensitive drum 11 is disposed at the center in the X direction of the process unit 302 in FIG. 30. In other words, the photosensitive drum 11 is disposed at such a position that the center of the process unit 302 in the X direction and the center of the photosensitive drum 11 in the X direction coincide with each other.

Figure 31:
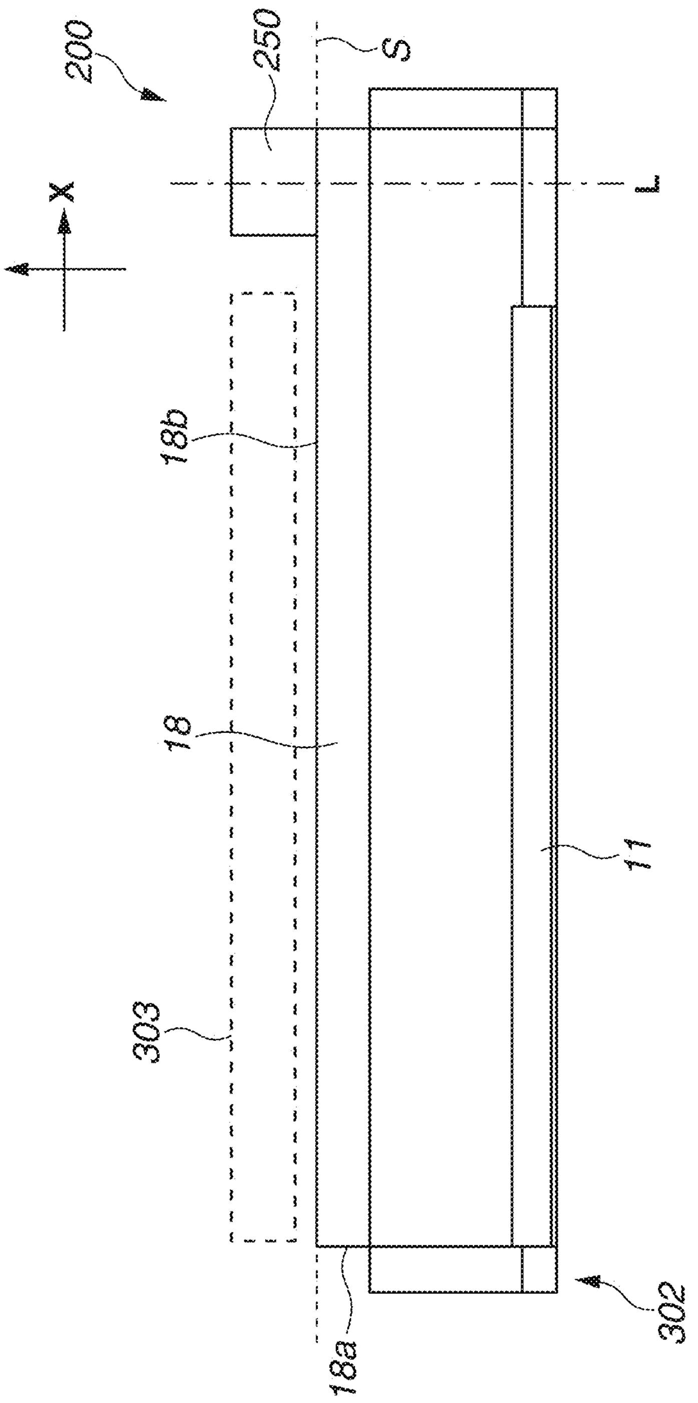
FIG. 31 is a diagram illustrating the position of a photosensitive member in the process unit.

As illustrated in FIG. 31, the photosensitive drum 11 may be disposed at a position off a centerline L (indicated by a dashed-dotted line) of the supply unit 200 in the X direction. In FIG. 31, a protrusion 250 is a part of the supply unit 200, and protrudes upward from the virtual surface S (indicated by a dotted line) passing through the upper end 18*b* of the frame 18*a* of the storage unit 18. In other words, if the process units 302 are applied to the configuration described with reference to FIG. 13, the entire attachment portion 201, a part of the toner receiving portion 202, and a part of the supply path portion 203 are included in the protrusion 250.

If the photosensitive drum 11 is disposed at the position as illustrated in FIG. 31, an optical box (not illustrated) can be disposed in a vacant space 303 next to the protrusion 250. As a result, the space can be effectively used, and the size of the image forming apparatus 300 can be reduced.

The image forming process of the image forming apparatus 300 will be briefly described. First, a recording material P placed on the feeding cassette 4 is fed by a pickup roller (not illustrated). Meanwhile, an optical box is disposed above the process units 302, and a light emitter (a laser diode) corresponding to each of the process units 302 is disposed in this optical box. A laser beam is emitted from each of the light emitters based on image data, and an electrostatic latent image is thereby formed on each of the photosensitive drums 11 and developed using the developer of the electrostatic latent image by the development roller included in the process unit 302. Furthermore, an intermediate transfer belt (not illustrated) forming a transfer nip with each of the photosensitive drums 11 is disposed below the process units 302, and the developed image formed on the photosensitive drum 11 is transferred to the intermediate transfer belt by application of a transfer bias of the transfer roller. Subsequently, the recording material P fed by the pickup roller is conveyed to a nip portion formed by the intermediate transfer belt and a secondary transfer roller by conveyance members such as the conveyance rollers, and the developed image formed on the intermediate transfer belt is transferred onto the recording material P at the nip portion. The developed image transferred to the recording material P is fixed by heat from a fixing device (not illustrated), and then discharged from the discharge port 15 to the discharge tray 14.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image forming apparatus to which a first toner container storing a first toner and a second toner container storing a second toner are attachable, the image forming apparatus comprising:

a first photosensitive drum rotatable about a first rotational axis extending in a first direction intersecting with a gravity direction;

a first toner accommodating portion configured to accommodate the first toner;

a first toner supply port to which the first toner container is attachable and through which the first toner is supplied from the first toner container to the first toner accommodating portion;

a second photosensitive drum rotatable about a second rotational axis extending in the first direction;

a second toner accommodating portion configured to accommodate the second toner;

a second toner supply port to which the second toner container is attachable and through which the second toner is supplied from the second toner container to the second toner accommodating portion, the second toner supply port being aligned with the first toner supply port in a second direction intersecting with both the first direction and the gravity direction;

a cover portion movable between an open position where the first and second toner supply ports are exposed so as to allow an attachment of the first toner container to the first toner supply port and an attachment of the second toner container to the second toner supply port and a closed position where the first and second toner supply ports are covered so as not to allow the attachment of the first toner container to the first toner supply port and the attachment of the second toner container to the second toner supply port, wherein a first toner supply operation in which the first toner is supplied from the first toner container to the first toner accommodating portion through the first toner supply port is possible in a state in which the cover portion is in the open position, and a second toner supply operation in which the second toner is supplied from the second toner container to the second toner accommodating portion through the second toner supply port is possible in a state in which the cover portion is in the open position, and wherein the first toner supply operation and the second toner supply operation are performed by user operations including directly manipulating, respectively, the first toner container and the second toner container to discharge the first toner and the second toner through the first toner supply port and the second toner supply port while the first toner container is attached to the first toner supply port and the second toner container is attached to the second toner supply port.

2. The image forming apparatus according to claim 1, wherein the first and second toner supply ports are provided on an end portion of the image forming apparatus in the first direction.

3. The image forming apparatus according to claim 1, further comprising: a discharge tray on which a sheet is discharged from an inside of the image forming apparatus to an outside of the image forming apparatus, wherein the first and second toner supply ports are provided outside of the discharge tray when viewed in the gravity direction.

4. The image forming apparatus according to claim 3, wherein the first and second toner supply ports are aligned with the discharge tray in the first direction when viewed in the gravity direction.

5. The image forming apparatus according to claim 3, wherein the first and second toner supply ports are provided below the discharge tray.

6. The image forming apparatus according to claim 1, wherein the cover portion is rotatable about a third rotational axis extending in the second direction between the open position and the closed position.

7. The image forming apparatus according to claim 6, further comprising: a discharge tray on which a sheet is discharged from an inside of the image forming apparatus to an outside of the image forming apparatus, wherein the cover portion approaches the discharge tray as the cover portion is rotated upward from the closed position toward the open position.

8. The image forming apparatus according to claim 1, wherein a first frame constituting the first toner accommodating portion is provided with a first protrusion on which the first toner supply port is provided, and a second frame constituting the second toner accommodating portion is provided with a second protrusion on which the second toner supply port is provided.

9. The image forming apparatus according to claim 8, wherein the first and second protrusions are provided on an end portion of the image forming apparatus in the first direction.

10. The image forming apparatus according to claim 9, further comprising: a laser unit configured to emit laser light to the first and second photosensitive drums, wherein the laser unit is aligned with the first and second protrusions in the first direction.

* * * * *